United States Patent
Hagisu et al.

(10) Patent No.: US 10,602,080 B2
(45) Date of Patent: Mar. 24, 2020

(54) FLOW LINE ANALYSIS SYSTEM AND FLOW LINE ANALYSIS METHOD

(71) Applicant: Panasonic i-PRO Sensing Solutions Co., Ltd., Fukuoka (JP)

(72) Inventors: Shinpei Hagisu, Fukuoka (JP); Tetsuo Tayama, Fukuoka (JP); Hidetoshi Kinoshita, Fukuoka (JP); Koji Yano, Kanagawa (JP); Manabu Nakamura, Fukuoka (JP); Takae Oguchi, Fukuoka (JP); Hideaki Takahashi, Fukuoka (JP)

(73) Assignee: Panasonic I-PRO Sensing Solutions Co., Ltd., Fukuoka (JP)

(*) Notice: Subject to any disclaimer, the term of this patent is extended or adjusted under 35 U.S.C. 154(b) by 132 days.

(21) Appl. No.: 15/040,687

(22) Filed: Feb. 10, 2016

(65) Prior Publication Data
US 2016/0309096 A1 Oct. 20, 2016

(30) Foreign Application Priority Data

Apr. 17, 2015 (JP) ................... 2015-085454

(51) Int. Cl.
*H04N 5/272* (2006.01)
*G06F 21/62* (2013.01)
(Continued)

(52) U.S. Cl.
CPC ............ *H04N 5/272* (2013.01); *G06F 21/60* (2013.01); *G06F 21/6254* (2013.01);
(Continued)

(58) Field of Classification Search
CPC .......... G06T 7/292; G06T 2207/30241; G06T 2207/30196; G06T 2207/30232;
(Continued)

(56) References Cited

U.S. PATENT DOCUMENTS 4,179,704 A * 12/1979 Moore .................. H04N 5/2625
348/579
4,233,631 A * 11/1980 Mahler ................ H04N 5/2625
348/579
(Continued)

FOREIGN PATENT DOCUMENTS

JP 08-242987 A 9/1996
JP 11144192 A * 5/1999
(Continued)

OTHER PUBLICATIONS

"An innovative monitor camera MOBOTIX Q24, 360° coverage can be monitored by only one camera never seen before", [online], OPN Corporation, 2014, [retrieved on Jun. 16, 2014].
(Continued)

*Primary Examiner* — David E Harvey
(74) *Attorney, Agent, or Firm* — Seed IP Law Group LLP

(57) ABSTRACT

A camera device generates a captured image, extracts flow line information relating to a staying position or a passing position of a moving object, and transmits the generated captured image and the extracted flow line information of the moving object to a server device for each predetermined transmission period. The server device generates a flow line analysis image in which the flow line information of the moving object is superimposed on the captured image and displays the generated flow line analysis image on a display. Furthermore, the server device switches a first flow line analysis image in a first predetermined period to a second flow line analysis image in a second predetermined period according to an operation of changing the period, and displays the resulting flow line analysis image.

11 Claims, 17 Drawing Sheets

(51) Int. Cl.
  *G06K 9/00* (2006.01)
  *H04N 7/18* (2006.01)
  *G06F 21/60* (2013.01)

(52) U.S. Cl.
  CPC ...... *G06K 9/00342* (2013.01); *G06K 9/00711* (2013.01); *G06K 9/00778* (2013.01); *H04N 7/181* (2013.01); *H04N 7/183* (2013.01); *G06K 2009/00738* (2013.01); *G06T 2207/10016* (2013.01); *G06T 2207/20221* (2013.01); *G06T 2207/30196* (2013.01); *G06T 2207/30232* (2013.01)

(58) Field of Classification Search
  CPC ............ G06T 7/20; G06T 2207/30242; G06K 9/00771; G06K 9/00711; G06K 9/00785; G06K 9/00778; G08B 13/19608; H04N 5/272
  See application file for complete search history.

(56) References Cited

U.S. PATENT DOCUMENTS

| | | | | |
|---|---|---|---|---|
| 6,295,367 | B1* | 9/2001 | Crabtree | G01S 3/7865 |
| | | | | 382/103 |
| 7,590,261 | B1* | 9/2009 | Mariano | G06K 9/00785 |
| | | | | 382/103 |
| 7,957,565 | B1* | 6/2011 | Sharma | G06K 9/00778 |
| | | | | 382/103 |
| 7,974,869 | B1* | 7/2011 | Sharma | G06Q 30/0202 |
| | | | | 705/7.31 |
| 8,009,863 | B1* | 8/2011 | Sharma | G06K 9/00335 |
| | | | | 348/159 |
| 8,098,888 | B1* | 1/2012 | Mummareddy | G06K 9/00778 |
| | | | | 382/103 |
| 8,098,891 | B2* | 1/2012 | Lv | G06T 7/292 |
| | | | | 348/143 |
| 8,189,926 | B2* | 5/2012 | Sharma | G06K 9/00771 |
| | | | | 382/103 |
| 8,289,390 | B2 | 10/2012 | Aggarwal et al. | |
| 8,310,542 | B2 | 11/2012 | Girgensohn et al. | |
| 8,355,046 | B2* | 1/2013 | Fujii | H04N 7/181 |
| | | | | 348/143 |
| 8,380,558 | B1* | 2/2013 | Sharma | G06Q 30/02 |
| | | | | 348/69 |
| 8,614,744 | B2* | 12/2013 | Brown | G08B 13/19613 |
| | | | | 340/565 |
| 8,964,036 | B2* | 2/2015 | Golan | G06K 9/00771 |
| | | | | 348/150 |
| 8,965,042 | B2 | 2/2015 | Borger et al. | |
| 9,361,520 | B2* | 6/2016 | Collins | G06K 9/00711 |
| 9,430,923 | B2* | 8/2016 | Kniffen | G08B 13/194 |
| 9,436,692 | B1* | 9/2016 | Fang | G11B 27/10 |
| 9,569,786 | B2* | 2/2017 | Shaw | G06K 9/00771 |
| 9,659,598 | B2* | 5/2017 | Adam | G11B 27/34 |
| 9,679,200 | B2* | 6/2017 | Schlattmann | G06K 9/00624 |
| 9,875,408 | B2* | 1/2018 | Adachi | G06K 9/00771 |
| 10,120,536 | B2 | 11/2018 | Cha et al. | |
| 2002/0085092 | A1* | 7/2002 | Choi | G06K 9/00335 |
| | | | | 348/77 |
| 2003/0053659 | A1* | 3/2003 | Pavlidis | G06K 9/00335 |
| | | | | 382/103 |
| 2005/0043933 | A1* | 2/2005 | Rappaport | H04L 41/22 |
| | | | | 703/1 |
| 2005/0169367 | A1* | 8/2005 | Venetianer | G06K 9/00369 |
| | | | | 375/240.01 |
| 2005/0185823 | A1* | 8/2005 | Brown | G08B 13/19604 |
| | | | | 382/103 |
| 2005/0288911 | A1* | 12/2005 | Porikli | G06K 9/00335 |
| | | | | 703/2 |
| 2006/0062431 | A1* | 3/2006 | Low | G01S 3/7864 |
| | | | | 382/103 |
| 2006/0187305 | A1 | 8/2006 | Trivedi et al. | |
| 2007/0229663 | A1* | 10/2007 | Aoto | G06K 9/00335 |
| | | | | 348/155 |
| 2007/0248244 | A1* | 10/2007 | Sato | G06F 17/30265 |
| | | | | 382/103 |
| 2007/0296814 | A1 | 12/2007 | Cooper et al. | |
| 2008/0130949 | A1* | 6/2008 | Ivanov | H04N 7/181 |
| | | | | 382/103 |
| 2008/0212099 | A1* | 9/2008 | Chen | G06T 7/20 |
| | | | | 356/408 |
| 2009/0002489 | A1* | 1/2009 | Yang | G06K 9/00771 |
| | | | | 348/143 |
| 2009/0134968 | A1 | 5/2009 | Girgensohn et al. | |
| 2009/0222388 | A1* | 9/2009 | Hua | G06N 5/02 |
| | | | | 706/12 |
| 2009/0268028 | A1 | 10/2009 | Ikumi et al. | |
| 2010/0013931 | A1 | 1/2010 | Golan et al. | |
| 2010/0013935 | A1* | 1/2010 | Ma | G06K 9/00771 |
| | | | | 348/169 |
| 2010/0045799 | A1* | 2/2010 | Lei | G06K 9/00369 |
| | | | | 348/169 |
| 2010/0225765 | A1 | 9/2010 | Kadogawa | |
| 2011/0072037 | A1* | 3/2011 | Lotzer | G06F 17/30855 |
| | | | | 707/769 |
| 2011/0199461 | A1* | 8/2011 | Horio | G06T 7/20 |
| | | | | 348/46 |
| 2011/0205355 | A1* | 8/2011 | Liu | G06T 7/80 |
| | | | | 348/135 |
| 2011/0231419 | A1* | 9/2011 | Papke | G06F 16/784 |
| | | | | 707/756 |
| 2012/0045149 | A1* | 2/2012 | Arai | H04N 7/183 |
| | | | | 382/296 |
| 2012/0163657 | A1* | 6/2012 | Shellshear | G06K 9/00751 |
| | | | | 382/103 |
| 2012/0242853 | A1* | 9/2012 | Jasinski | H04N 5/23232 |
| | | | | 348/222.1 |
| 2013/0091432 | A1 | 4/2013 | Shet et al. | |
| 2013/0147961 | A1 | 6/2013 | Gao et al. | |
| 2013/0223688 | A1* | 8/2013 | Golan | G06K 9/00771 |
| | | | | 382/103 |
| 2014/0023233 | A1 | 1/2014 | Stefanovic | |
| 2014/0119594 | A1 | 5/2014 | Chou et al. | |
| 2014/0125805 | A1 | 5/2014 | Golan et al. | |
| 2014/0226855 | A1* | 8/2014 | Savvides | G06K 9/00771 |
| | | | | 382/103 |
| 2014/0355829 | A1 | 12/2014 | Heu et al. | |
| 2015/0120237 | A1* | 4/2015 | Gouda | G06T 7/215 |
| | | | | 702/150 |
| 2015/0187088 | A1 | 7/2015 | Iwai et al. | |
| 2015/0222861 | A1 | 8/2015 | Fujii et al. | |
| 2015/0278608 | A1* | 10/2015 | Matsumoto | G06K 9/00342 |
| | | | | 348/143 |
| 2015/0286866 | A1* | 10/2015 | Kawaguchi | G06K 9/00624 |
| | | | | 382/103 |
| 2015/0289111 | A1* | 10/2015 | Ozkan | H04W 4/40 |
| | | | | 455/456.1 |
| 2015/0379725 | A1 | 12/2015 | Kuwahara et al. | |
| 2016/0063712 | A1 | 3/2016 | Matsumoto et al. | |
| 2016/0104174 | A1* | 4/2016 | Matsumoto | G06Q 30/0201 |
| | | | | 705/7.29 |
| 2016/0142679 | A1* | 5/2016 | Miyoshi | H04N 7/18 |
| | | | | 348/159 |
| 2016/0307049 | A1 | 10/2016 | Hagisu et al. | |
| 2016/0309096 | A1* | 10/2016 | Hagisu | G06K 9/00342 |
| 2016/0349972 | A1* | 12/2016 | Miyoshi | G06F 3/04845 |
| 2017/0330330 | A1 | 11/2017 | Seki et al. | |
| 2017/0330434 | A1 | 11/2017 | Takahashi et al. | |
| 2017/0337426 | A1* | 11/2017 | Werner | G06K 9/00744 |
| 2017/0351924 | A1* | 12/2017 | Hotta | G06K 9/00778 |
| 2017/0352380 | A1* | 12/2017 | Doumbouya | G06F 3/0482 |
| 2018/0048789 | A1 | 2/2018 | Hayashi | |

FOREIGN PATENT DOCUMENTS

| | | | |
|---|---|---|---|
| JP | 2003-205159 | A | 7/2003 |
| JP | 2003-256843 | A | 9/2003 |
| JP | 2005-148863 | A | 6/2005 |
| JP | 2006-309280 | A | 11/2006 |

(56) References Cited

FOREIGN PATENT DOCUMENTS

| JP | 2008-76234 A | 4/2008 |
|---|---|---|
| JP | 2009-134688 A | 6/2009 |
| JP | 2009-265830 A | 11/2009 |
| JP | 2010-231629 A | 10/2010 |
| JP | 2011-248836 A | 12/2011 |
| JP | 2011-254289 A | 12/2011 |
| JP | 2012-203680 A | 10/2012 |
| JP | 5597762 B1 | 10/2014 |
| JP | 5597781 B1 | 10/2014 |
| JP | 5683663 B1 | 3/2015 |
| JP | 2015-149557 A | 8/2015 |
| JP | 2015-149558 A | 8/2015 |
| JP | 2015-149559 A | 8/2015 |
| JP | 2016-15540 A | 1/2016 |
| JP | 2016-15579 A | 1/2016 |
| JP | 5838371 B1 | 1/2016 |
| WO | 2010/044186 A1 | 4/2010 |
| WO | WO 2013/072401 A2 * | 5/2013 |

OTHER PUBLICATIONS

International Search Report dated Jul. 5, 2016, for corresponding International Application No. PCT/JP2016/002063, 9 pages.
Non-Final Office Action, dated May 22, 2018, for the related U.S. Appl. No. 15/099,352, 23 pages.
Final Office Action, dated Oct. 23, 2018, for U.S. Appl. No. 15/484,931, 25 pages.
Final Office Action, dated Feb. 7, 2019, for U.S. Appl. No. 15/536,572, 9 pages.
Mobotix, "MxAnalytics—Camera-Integrated Video Analysis With the Mobotix Q24," Security Vision Systems, 6 pages.
Non-Final Office Action, dated May 2, 2018, for U.S. Appl. No. 15/484,931, 28 pages.
Non-Final Office Action, dated Aug. 23, 2018, for U.S. Appl. No. 15/536,572, 9 pages.
Non-Final Office Action, dated Apr. 16, 2019, for U.S. Appl. No. 15/484,931, 32 pages.
Non-Final Office Action, dated Jun. 13, 2019, for U.S. Appl. No. 15/536,572, 9 pages.
Final Office Action, dated Dec. 20, 2018, for U.S. Appl. No. 15/099,352, 20 pages.
Non-Final Office Action, dated May 31, 2019, for U.S. Appl. No. 15/099,352, 23 pages.
U.S. Appl. No. 15/099,352, filed Apr. 14, 2016, Flow Line Analysis System and Flow Line Analysis Method.
U.S. Appl. No. 15/484,931, filed Apr. 11, 2017, Moving Information Analyzing System and Moving Information Analyzing Method.
U.S. Appl. No. 15/536,572, filed Jun. 15, 2017, Flow Line Analysis System and Flow Line Display Method.

* cited by examiner

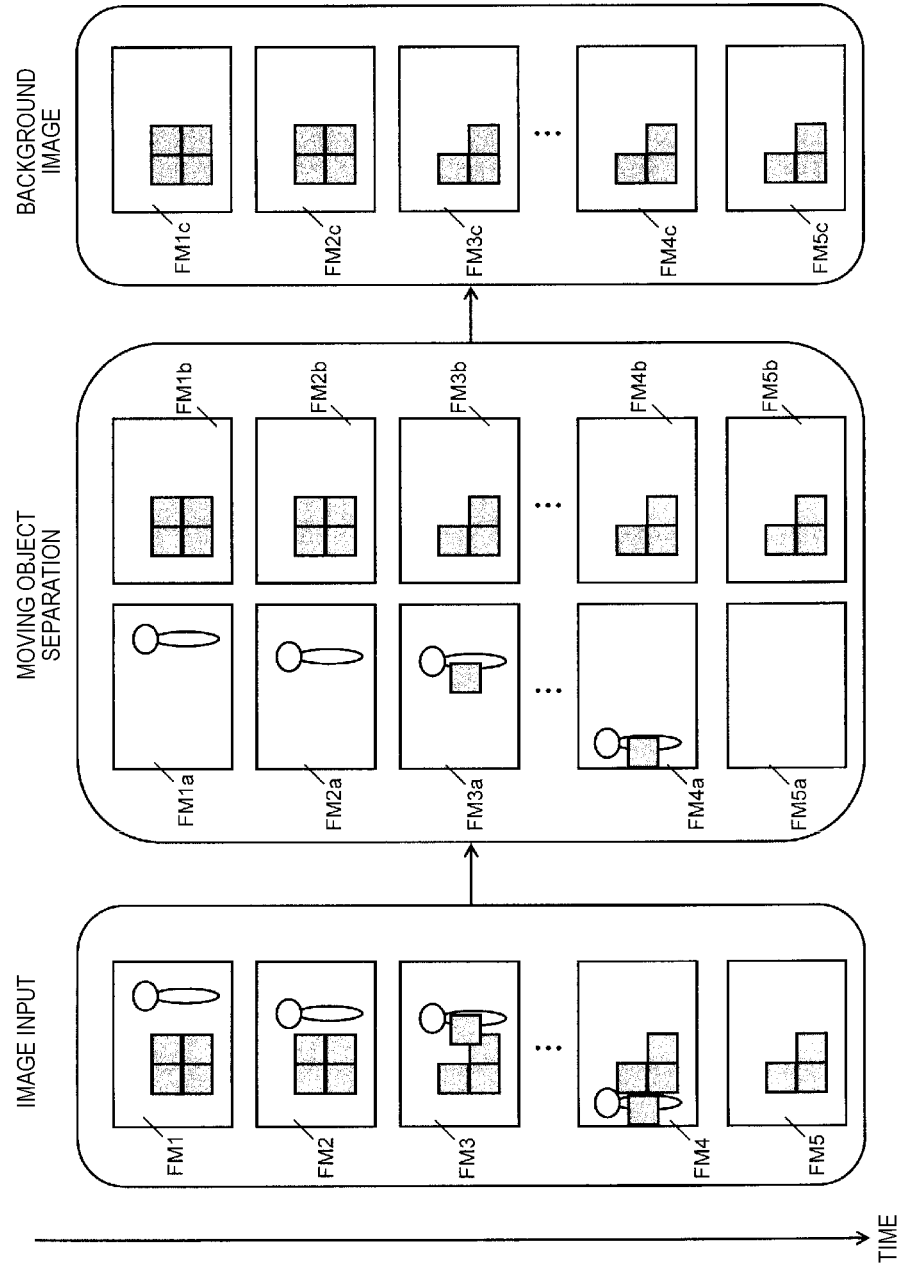

FLOW LINE ANALYSIS SYSTEM AND FLOW LINE ANALYSIS METHOD

BACKGROUND OF THE INVENTION

1. Field of the Invention

The present invention relates to a flow line analysis system and a flow line analysis method that generate a flow line analysis image in which staying information or passing information of a person is superimposed on an image captured by a camera device.

2. Description of the Related Art

For example, Japanese Patent Unexamined Publication No. 2009-134688 is known as a technology in the related art for displaying an activity level of a person for each time interval in an imaging location where a camera device is installed, as a heat map image.

In Japanese Patent Unexamined Publication No. 2009-134688, a technology is disclosed, in which an activity level is calculated by analyzing a flow line of a person in an imaging location where a security camera is installed via a network connection, a heat map image in which a detection result of a sensor is superimposed on a floor plan of the imaging location, is generated, and the heat map image is displayed on a screen of a browser corresponding to the security camera. In this way, by viewing the heat map image displayed on the screen of the browser, it is possible to ascertain the activity level of the person in the imaging location.

In addition, other than the floor plan disclosed in Japanese Patent Unexamined Publication No. 2009-134688, a technology for generating and displaying a heat map image in which a flow line density of a person or a detection result of the number of persons is superimposed on the image captured by the camera device is proposed. For example, refer to "An innovative monitor camera MOBOTIX Q24, 360° coverage can be monitored by only one camera never seen before", [online], OPN Corporation, 2014, [retrieved on 2014 Jun. 16], Retrieved from the Internet.

Here, in a case where the detection result of the sensor is superimposed on the floor plan in Japanese Patent Unexamined Publication NO. 2009-134688, it is necessary that the floor plan and the image from the security camera in the imaging location accurately match (coincide). However, in Japanese Patent Unexamined Publication No. 2009-134688, since the floor plan is not changed, the image and the floor plan match only in a case where there is no change in an arrangement of the imaging location from the time when the floor plan which is a base of the heat map image is created.

Here, a case is considered, in which the camera device captures an image of an imaging area (for example, a predetermined position in a store), and thereafter, a layout relating to an arrangement of a commodity shelf in the store is changed.

When generating the heat map image in which the staying information or the passing information of the person is superimposed on the image captured by the camera device, if the layout in the store is changed, the staying information or the passing information of the person before the change and the image captured by the camera device after the change do not match. Therefore, the heat map image having accurate staying information or passing information cannot be obtained.

Therefore, in Japanese Patent Unexamined Publication No. 2009-134688, it is necessary to change the layout in the floor plan at each time when the layout in the store is changed, and in NPL 1, since the image which is the base of the heat map image is an image obtained from an image captured by the camera device, the person appears in this image, and thus, a problem occurs that privacy of the person cannot be appropriately protected.

SUMMARY OF THE INVENTION

The present disclosure has an object to provide a flow line analysis system and a flow line analysis method in which privacy of a person reflected in an imaging area can be appropriately protected, an accurate flow line analysis image in which staying information or passing information of the person is superimposed on a background image updated at a predetermined timing is generated, and then, a trend among the flow line analysis images can be checked with a simple operation.

The present disclosure provides a flow line analysis system to which a camera device and a server device are connected. The camera device includes an image capture that captures an image of an imaging area, a background image generator that repeatedly generates a background image of the captured image of the imaging area, a flow line information analyzer that extracts flow line information relating to a staying position or a passing position of a moving object in the imaging area included in the captured image, and a transmitter that transmits the background image generated by the background image generator for each predetermined transmission period and the flow line information of the moving object extracted by the flow line information analyzer to the server device. The server device includes an image generator that generates a flow line analysis image in which flow line information of the moving object is superimposed on the background image of the captured image and a display controller that displays the flow line analysis image generated by the image generator on a displayer. The display controller switches a first flow line analysis image generated by the image generator at a first timing and displayed on the displayer to a second flow line analysis image generated by the image generator at a second timing according to an operation of changing the timing, and displays the resulting flow line analysis image on the displayer.

According to the present disclosure, privacy of a person reflected on the imaging area can be appropriately protected, and an accurate flow line analysis image in which staying information or passing information is superimposed on the background image updated in a predetermined timing can be generated, and thus, it is possible to check the trend among the flow line analysis images by a simple operation.

BRIEF DESCRIPTION OF DRAWINGS

FIG. 3 is a diagram describing an operation overview of a background image generator in a camera device in the present embodiment.

DETAILED DESCRIPTION OF THE PREFERRED EMBODIMENTS

Hereafter, an embodiment in which a flow line analysis system and a flow line analysis method according to the present invention are specifically disclosed (hereafter, referred to as "present embodiment") will be described in detail with reference to the appropriate drawings. However, in some cases, an excessively detailed description may be omitted. For example, there are cases where a detail description on the already well-known matters or a repeated description on substantially the same configuration is omitted. The reason for this is to avoid unnecessary redundant description and to facilitate easy understanding for those skilled in the art. The description below and the drawings are provided for those skilled in the art to sufficiently understand the present disclosure, and thereby do not have an intention of limiting the subject disclosed in the aspects of the invention. The present invention may be specified as a flow line analysis image generation method including an operation (step) of generating a flow line analysis image (refer to a description below) using a camera device.

Figure 1:
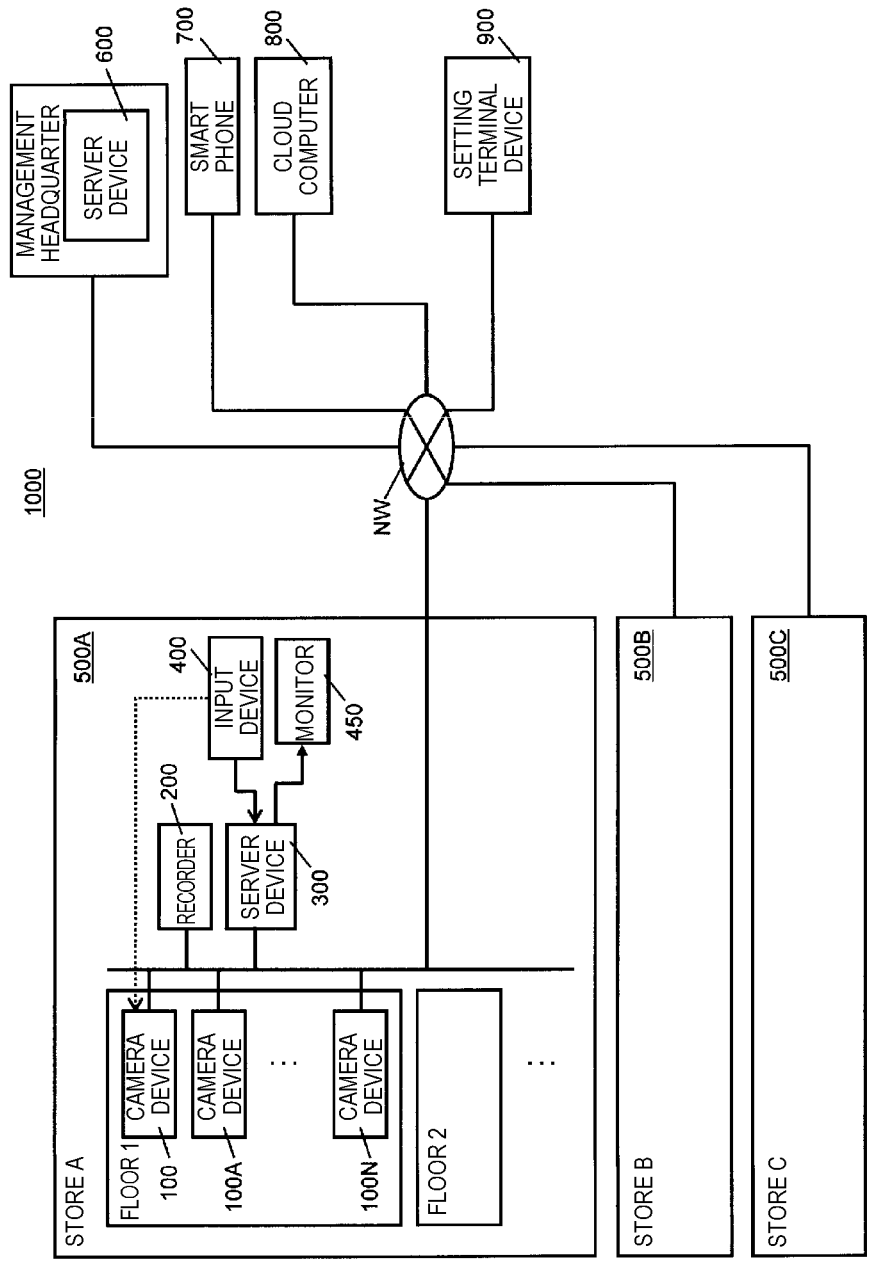
FIG. 1 is a system configuration diagram illustrating details of a system configuration of a sales management system including a flow line analysis system in the present embodiment.

In addition, in the present embodiment described below, as illustrated in FIG. 1, the description will be made under an assumption of a usage pattern of sales management system 1000, in which, for example, flow line analysis systems 500A, 500B, 500C, . . . according to the present invention are installed in each of a plurality of stores (store A, store B, and store C), and a plurality of flow line analysis systems 500A, 500B, 500C, . . . are connected to each other via network NW. However, the embodiment of the flow line analysis system, a camera device, and a flow line analysis method according to the present invention is not limited to the contents in the present embodiment described below.

FIG. 1 is a system configuration diagram illustrating details of a system configuration of sales management system 1000 including flow line analysis systems 500A, 500B, 500C, . . . in the present embodiment. Sales management system 1000 illustrated in FIG. 1 is configured to include flow line analysis systems 500A, 500B, 500C, . . . respectively installed in a plurality of stores A, B, C, . . . , server device 600 in a management headquarters, smart phone 700, cloud computer 800, and setting terminal device 900.

Each of flow line analysis systems 500A, 500B, 500C, . . . , server device 600 in the management headquarters, smart phone 700, cloud computer 800, and setting terminal device 900 are connected to each other via network NW. Network NW is a wireless network or a wired network. The wireless network is, for example, the local area network (LAN), the wide area network (WAN), the 3G, the long term evolution (LTE), or the wireless gigabit (WiGig). The wired network is, for example, an intranet or the internet.

Flow line analysis system 500A installed in store A illustrated in FIG. 1 is configured to include a plurality of camera devices 100, 100A, . . . , 100N installed on floor 1, recorder 200, server device 300, input device 400, and monitor 450. A plurality of camera devices similar to floor 1 is also installed on floor 2 and the camera devices on floor 2 are omitted to be illustrated. The internal configurations of each of camera devices 100, 100A, . . . , 100N are the same, and the details thereof will be described below with reference to FIG. 2.

Recorder 200 is configured using, for example, a semiconductor memory or a hard disk device, and stores data of an image captured by the camera device installed in store A (hereafter, the image captured by the camera device is referred to as "captured image"). The data of the captured image stored in recorder 200 is, for example, provided for a monitoring operation such as security affairs.

Server 300 is configured using, for example, a personal computer (PC), and notifies camera device 100 of the fact that a predetermined event (for example, a layout change of sales areas on floor 1 in store A) has occurred according to an input operation of a user (for example, a user who operates the flow line analysis system and is a clerk or a manager of store A, hereafter the same) who operates input device 400.

In addition, server device 300 generates a flow line analysis image in which flow line information relating to a staying position or a passing position of a moving object (for example, persons such as a clerk, a manager, and visiting customers, hereafter the same) in an imaging area of a camera device (for example, camera device 100) is superimposed on the captured image from the camera device (for example, camera device 100) using data (refer to description below) transmitted from the camera device (for example, camera device 100), and displays the flow line analysis image on monitor 450.

Furthermore, server device 300 performs predetermined processing (for example, flow line analysis report generation processing described below) according to an input operation a user who operates input device 400, and displays the flow line analysis report on monitor 450. Details of the internal configuration of server device 300 will be described below with reference to FIG. 2.

Input device 400 is configured using, for example, a mouse, a keyboard, and a touch panel or a touch pad, and outputs signals according to the input operation of the user to camera device 100 or server device 300. In FIG. 1, in order to make the drawing simple, an arrow is illustrated only between input device 400 and camera device 100. However, arrows may be illustrated between input device 400 and other camera devices (for example, camera devices 100A and 100N).

Monitor 450 is configured using, for example, a liquid crystal display (LCD) or an organic electroluminescence (EL), and displays the flow line analysis image or data of the flow line analysis report generated by server device 300. Monitor 450 is provided as an external device different from server device 300. However, monitor 450 may be configured to be included inside of server device 300.

Server device 600 in the management headquarters is a viewing device that acquires and displays the flow line analysis image or the flow line analysis report generated by flow line analysis systems 500A, 500B, 500C, . . . installed in each store A, B, C, . . . according to the input operation of an employee (for example, an officer) in the management headquarters who operates server device 600 in the management headquarters. In addition, server device 600 in the management headquarters holds various information items (for example, sales information, information on the number of visiting customers, event schedule information, highest temperature information, and lowest temperature information) needed for generating the flow line analysis report (refer to FIG. 12). Those various information items may be held in the server devices installed for each store A, B, C, . . . . Server device 600 in the management headquarters may execute each processing in the server devices installed for each store A, B, C, . . . (for example, server device 300 in store A). In this way, server device 600 in the management headquarters can generate the flow line analysis report (for example, refer to FIG. 12 described below) by aggregating the data items of each store A, B, C, . . . , can acquire detail data (for example, the flow line analysis report or the like illustrated in FIG. 12) of one store selected by the input operation to server device 600 in the management headquarters, or can perform the displaying of a data comparison result in a specific sales area (for example, a meat sales area) between a plurality of stores.

Smart phone 700 is a viewing device that acquires and displays the flow line analysis image or the flow line analysis report generated by flow line analysis systems 500A, 500B, 500C, . . . installed in each store A, B, C, . . . according to the input operation of an employee (for example, a sales representative) in the management headquarters who operates smart phone 700.

Cloud computer 800 is an on line storage that stores the flow line analysis image or the data of the flow line analysis report generated by flow line analysis systems 500A, 500B, 500C, . . . installed in each store A, B, C, . . . , performs predetermined processing (for example, searching and extraction of the flow line analysis report on Y date in M month) according to an input operation of the employee (for example, the sales representative) in the management headquarters who operates smart phone 700, and then, transmits the result of processing to smart phone 700.

Setting terminal device 900 is configured, for example, using a PC, and can cause dedicated browser software that displays a setting screen of the camera devices of flow line analysis systems 500A, 500B, 500C, . . . installed in each store A, B, C, . . . to be executed. Setting terminal device 900 displays a setting screen (for example, common gateway interface (CGI)) of the camera device on the browser software according to an input operation of an employee (for example, a system manager of sales management system 1000) in the management headquarters who operates setting terminal device 900, and edits (modifies, adds, deletes) the setting information of the camera device.

Camera Device

Figure 2:
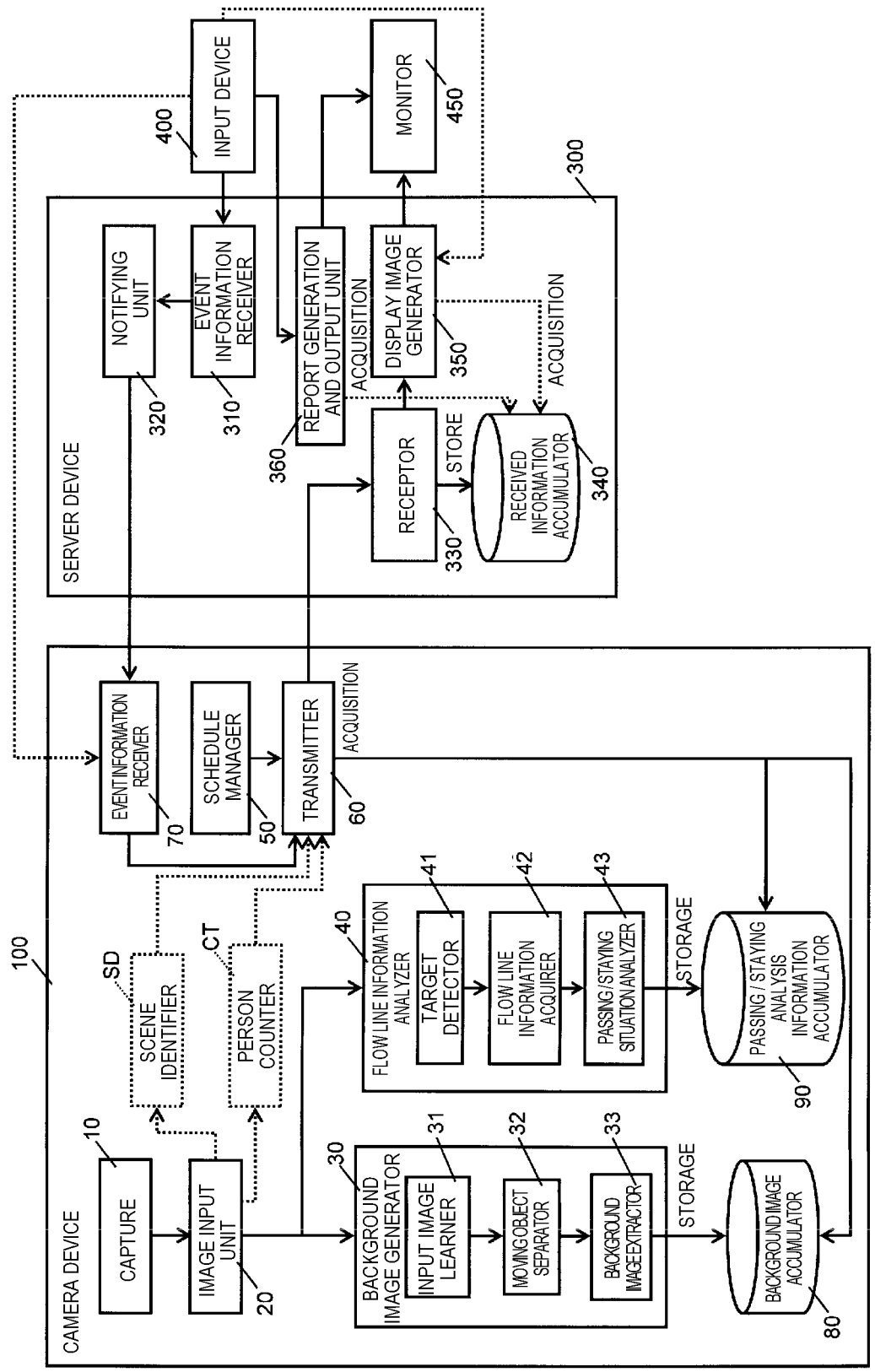
FIG. 2 is a block diagram illustrating details of a functional and internal configuration of a camera device and a server device in the present embodiment.

FIG. 2 is a block diagram illustrating details of a functional and internal configuration of camera device 100 and server device 300 in the present embodiment. In sales management system 1000 illustrated in FIG. 1, since each camera devices installed in stores A, B, C, . . . has the same configuration, respectively, in FIG. 2, the description will be made with camera device 100 as an example.

Camera device 100 illustrated in FIG. 2 is configured to include capture 10, image input unit 20, background image generator 30, flow line information analyzer 40, schedule manager 50, transmitter 60, event information receiver 70, background image accumulator 80, and passing/staying analysis information accumulator 90. Background image generator 30 has a configuration to include input image learner 31, moving object separator 32, and background image extractor 33. Flow line information analyzer 40 has a configuration to include target detector 41, flow line information acquirer 42, and passing/staying situation analyzer 43.

Capture 10 includes at least a lens and an image sensor. The lens condenses lights (rays) being incident from the outside of camera device 100 and forms an image on a predetermined imaging surface on the image sensor. A fish-eye lens or a wide angle lens from which an angle of view of equal to or higher than 140° can be obtained is used as the lens. The image sensor is a solid-state imaging device such as a charge coupled device (CCD) or a complementary metal oxide semiconductor (CMOS), and converts the optical image formed on the imaging surface to an electric signal.

Image input unit 20 is configured using, for example, a central processing unit (CPU), a micro processing unit (MPU), or a digital signal processor (DSP), and performs predetermined signal processing using the electric signal from capture 10, generates data (frame) of the captured image defined by RGB (red, green, and blue) or YUV (brightness and color difference) that can be recognized by a person, and then, outputs the data to background image generator 30 and flow line information analyzer 40.

Background image generator 30 is configured using, for example, the CPU, the MPU, or the DSP and generates a background image in which the moving object (for example, a person) included in the captured image is eliminated, at a predetermined frame rate (for example, 30 frames per second (fps)) for each piece of data (frame) of the captured image output from image input unit 20, and then, holds the background image in background image accumulator 80. In the background image generation processing in background image generator 30, a method disclosed in reference patent literature Japanese Patent Unexamined Publication No.

2012-203680 can be used, but the method is not limited to the reference patent literature.

Figure 4B:
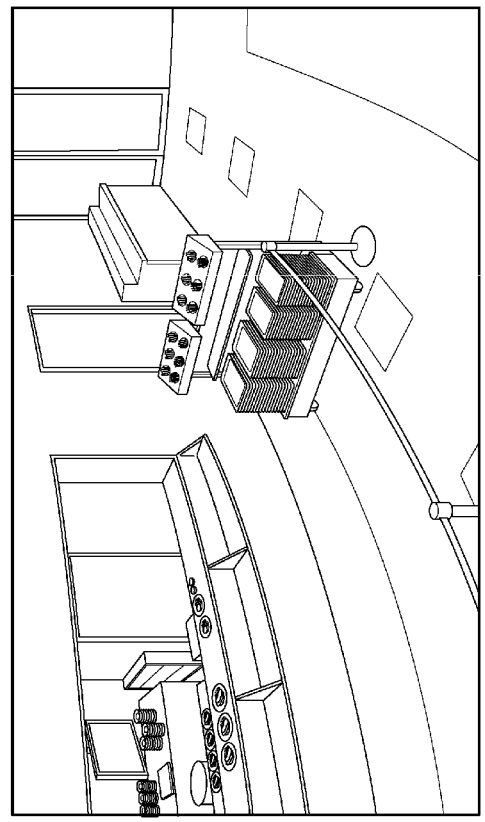
FIG. 4A is a picture illustrating an example of a captured image input to an image input unit and FIG. 4B is a picture illustrating an example of a background image generated by the background image generator.
Figure 4A:
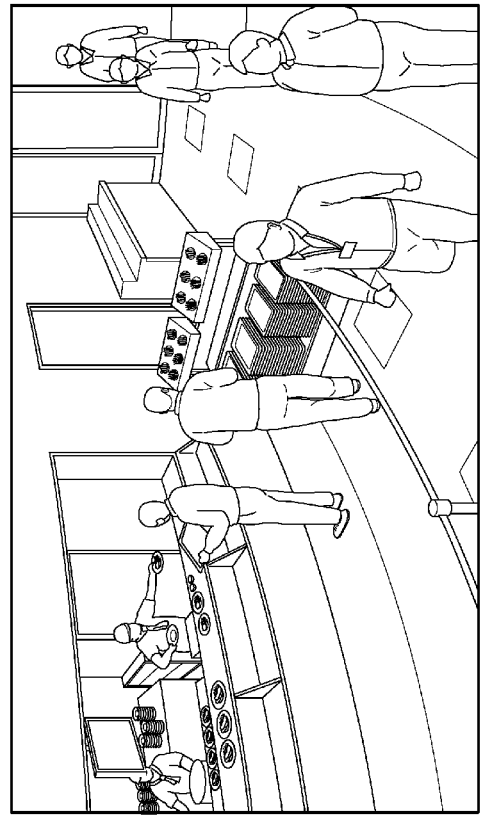

Here, an operation overview of background image generator 30 will be briefly described with reference to FIG. 3, FIG. 4A and FIG. 4B. FIG. 3 is a diagram describing an operation overview of background image generator 30 in camera device 100 in the present embodiment. FIG. 4A is a picture illustrating an example of a captured image input to image input unit 20 and FIG. 4B is a picture illustrating an example of a background image generated by background image generator 30.

In FIG. 3, generation results of input image learner 31, moving object separator 32, and background image extractor 33 are schematically illustrated toward a direction from the left side of a sheet to the right side which is perpendicular to a time axis toward the bottom side of the sheet from the top side. A state in which a visiting customer of the store carries one cardboard box among four cardboard boxes containing beverage is illustrated.

Input image learner 31 analyzes a distribution state of values of the brightness and the color difference between each pixel in each of the frames (for example, each frame FM1 to FM5 illustrated in FIG. 3) of the plurality of captured images output from image input unit 20.

Moving object separator 32 separates the learning result of input image learner 31 (that is, the analysis result of the distribution states of the brightness and the color difference for each of the same pixels between the plurality of frames (for example, in the time axis direction illustrated in FIG. 3)) into moving object (for example, a person) information (for example, refer to frames FM1a to FM5a) and non-moving object (for example, a background) information (for example, refer to frames FM1b to FM5b) for each frame FM1 to FM5 of captured images. In frames FM3 and FM4 of the captured images illustrating the state of a person which is a moving object carrying the cardboard box, the values of the brightness and the color difference corresponding to the pixel of the cardboard box carried by the person are changed along the time axis direction (for example, refer to FIG. 3). Therefore, moving object separator 32 regards the cardboard box carried by the person as being the moving object.

Background image extractor 33 extracts frames FM1b to FM5b which reflect the non-moving object information among the information separated by moving object separator 32 as frames FM1c to FM5c of the background images from frames FM1 to FM5 of the captured images output from image input unit 20, and then, holds the frames in background image accumulator 80.

In frame FM10a of the captured image illustrated in FIG. 4A, a person who provides food and a person who receives the food on a tray in a restaurant are illustrated as moving objects respectively. In frame FM10c (refer to FIG. 4B) of the background image generated by background image generator 30 with respect to frame FM10a of the captured image illustrated in FIG. 4A, both the person who provides food and the person who receives the food in the same restaurant are eliminated so as not to be reflected as the moving object.

Flow line information analyzer 40 is configured using, for example, the CPU, the MPU, or the DSP, and detects flow line information relating to the staying position or the passing position of the moving object (for example, a person) included in the captured image, at a predetermined frame rate (for example, 10 fps) for each piece of data (frame) of the captured image output from image input unit 20, and then, holds the flow line information in passing/staying analysis information accumulator 90.

Target detector 41 performs predetermined image processing (for example, person detection processing or face detection processing) on the frames of the captured images output from image input unit 20, and then, detects the presence or absence of the moving object (for example, a person) included in the frames of the captured image. In a case where the moving object included in the frames of the captured image is detected, target detector 41 outputs the information (for example, coordinates information on the frame) relating to the detection area of the moving object in the frame of the captured image to flow line information acquirer 42. In a case where the moving object included in the frames of the captured image is not detected, target detector 41 outputs the information (for example, predetermined null information) relating to the detection area of the moving object to flow line information acquirer 42.

Flow line information acquirer 42 performs a linkage of the information items relating to the past and current detection areas using the information of the captured image output from image input unit 20 and the information (for example, the captured image information and the coordinates information) relating to the detection area of the past moving object based on the information relating to the detection area of the moving object output from target detector 41, and then, outputs the linked information to passing/staying situation analyzer 43 as the flow line information (for example, an amount of change of the coordinates information of the detection area of the moving object).

Passing/staying situation analyzer 43 extracts the flow line information (for example, "target position information", "flow line information", and "information relating to a passing situation or a staying situation") relating to the staying position or the passing position of the moving object (for example, the person) in the frame of the captured image with respect to the plurality of captured images based on the flow line information output from flow line information acquirer 42, and then, generates the flow line analysis image. In addition, passing/staying situation analyzer 43 may generate a visible image of a colored portion of the flow line analysis image (heat map image) generated by display image generator 350 in server device 300 using the result of extracting the flow line information relating to the staying position and the passing position of the moving object (for example, the person).

Passing/staying situation analyzer 43 can extract accurate flow line information relating to the position where the moving object (for example, the person) stayed or passed among the frames of the captured image output from image input unit 20 using the flow line information relating to the frame of the plurality of captured images, and then, generate the flow line analysis image.

Schedule manager 50 is configured using, for example, a CPU, an MPU, or a DSP, and notifies transmitter 60 of a predetermined transmission period for periodically transmitting the background image data stored in background image accumulator 80 and the data of the result of extracting the flow line information relating to the staying information or the passing information of the moving object stored in passing/staying analysis information accumulator 90 to server device 300. The predetermined transmission period is, for example, 15 minutes, 1 hour, 12 hours, or 24 hours, but not limited to those time intervals.

Transmitter 60 acquires the background image data stored in background image accumulator 80 and the data of the result of extracting the flow line information relating to the staying information or the passing information of the moving object stored in passing/staying analysis information accumulator 90 according to the notification from schedule manager 50 or event information receiver 70, and then, transmits the acquired data items to server device 300. Transmission timing in transmitter 60 will be described below with reference to FIGS. 5, 6, 7 and FIG. 8.

Event information receiver 70 as an example of the event information acquirer receives (acquires) a notification of detecting a predetermined event from server device 300 or input device 400 (for example, a change of the layout of sales areas on floor 1 in store A), and upon receiving the notification that the predetermined event is detected, then, outputs a transmission instruction to transmitter 60 to transmit the background image data stored in background image accumulator 80 and the data of the result of extracting the flow line information relating to the staying information or the passing information of the moving object stored in passing/staying analysis information accumulator 90 to server device 300.

Background image accumulator 80 is configured using, for example, a semiconductor memory or a hard disk device, and stores the background image data (frames) generated by background image generator 30.

Passing/staying analysis information accumulator 90 is configured using, for example, a semiconductor memory or a hard disk device, and stores the data of the result (for example, "target position information", "flow line information", and "information relating to the passing situation or the staying situation") of extracting the flow line information relating to the staying position or the passing position of the moving object (for example, the person) generated by flow line information analyzer 40.

Figure 13:
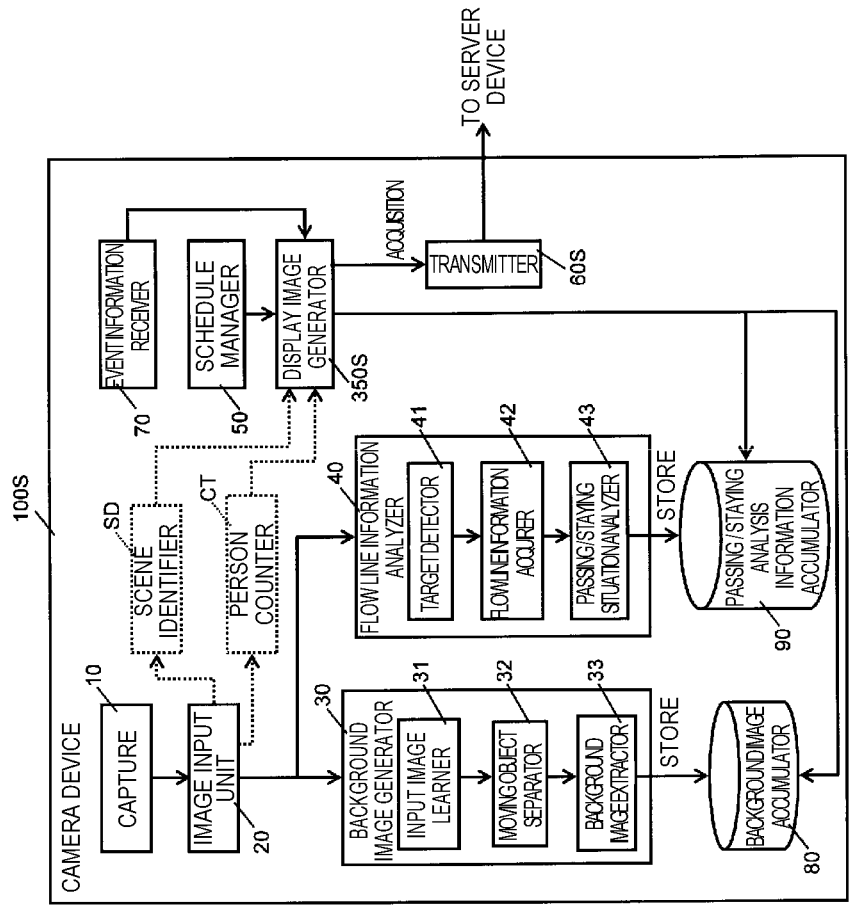
FIG. 13 is a block diagram illustrating details of the functional and internal configurations of the camera device in a modification example of the present embodiment.

In camera device 100 illustrated in FIG. 2 scene identifier SD may be provided instead of event information receiver 70, and the same hereafter (for example, refer to FIG. 13). Scene identifier SD as an example of an image change detector detects the presence or absence of a change (for example, an event in which the layout of the sales area on floor 1 in store A is changed) in the captured image output from image input unit 20. In a case where the change in the captured image is detected, scene identifier SD outputs a transmission instruction to transmitter 60 to transmit the background image data stored in background image accumulator 80 and the data of the result of extracting the flow line information relating to the staying information or the passing information of the moving object stored in passing/staying analysis information accumulator 90 to server device 300.

In addition, camera device 100 illustrated in FIG. 2 may further include person counter CT, and the same hereafter (for example, refer to FIG. 13). Person counter CT as an example of a moving object detector performs predetermined image processing (for example, person detection processing) on the captured image output from image input unit 20, and then, counts the number of detected moving objects included in the captured image. Person counter CT outputs the information relating to the number of detected moving objects included in the captured image to transmitter 60.

Server Device

Server device 300 illustrated in FIG. 2 is configured to include event information receiver 310, notifying unit 320, receptor 330, received information accumulator 340, display image generator 350, and report generation and output unit 360.

In a case where the information indicating that the predetermined event (for example, the change of the layout of the sales area on floor 1 in store A) has occurred for each camera device (for example, camera device 100) is input from input device 400, event information receiver 310 receives the notification that the predetermined event is detected. Event information receiver 310 outputs the reception of the notification that the predetermined event is detected to notifying unit 320. In the information indicating the occurrence of the predetermined event includes an identification number (for example, C1, C2, ... described below) of the camera device that captures the image of the position where the predetermined event has occurred as an imaging area.

Notifying unit 320 transmits the notification that the predetermined event is detected output from event information receiver 310 to the correspondent camera device (for example, camera device 100).

Receptor 330 receives the data (that is, the background image data stored in background image accumulator 80 and the data of the result of extracting the flow line information relating to the staying information or the passing information of the moving object stored in passing/staying analysis information accumulator 90) transmitted from transmitter 60 in camera device 100 and outputs the data to received information accumulator 340 and display image generator 350.

Received information accumulator 340 is configured using, for example, a semiconductor memory or a hard disk device, and stores the data (that is, background image data stored in background image accumulator 80 and the data of the result of extracting the flow line information relating to the staying information or the passing information of the moving object stored in passing/staying analysis information accumulator 90) received by receptor 330.

Display image generator 350 as an example of an image generator is configured using, for example, a CPU, an MPU, and a DSP, and generates a flow line analysis image in which the flow line information relating to the staying position or the passing position of the moving object is superimposed on the background image using the data (that is, background image data stored in background image accumulator 80 and the data of the result of extracting the flow line information relating to the staying information or the passing information of the moving object stored in passing/staying analysis information accumulator 90) acquired from receptor 330 or received information accumulator 340.

The flow line analysis image is a quantitatively visualized image in which the flow line information visually indicates that where the moving object frequently stays or where the moving object passes in the imaging area corresponding to the captured image within a predetermined range (for example, values of 0 to 255) of the background image where the moving object (for example, the person) is eliminated so as not to be reflected in the image captured by camera device 100, as a heat map. In addition, display image generator 350 as an example of a display controller displays the generated flow line analysis image on monitor 450.

Figure 5:
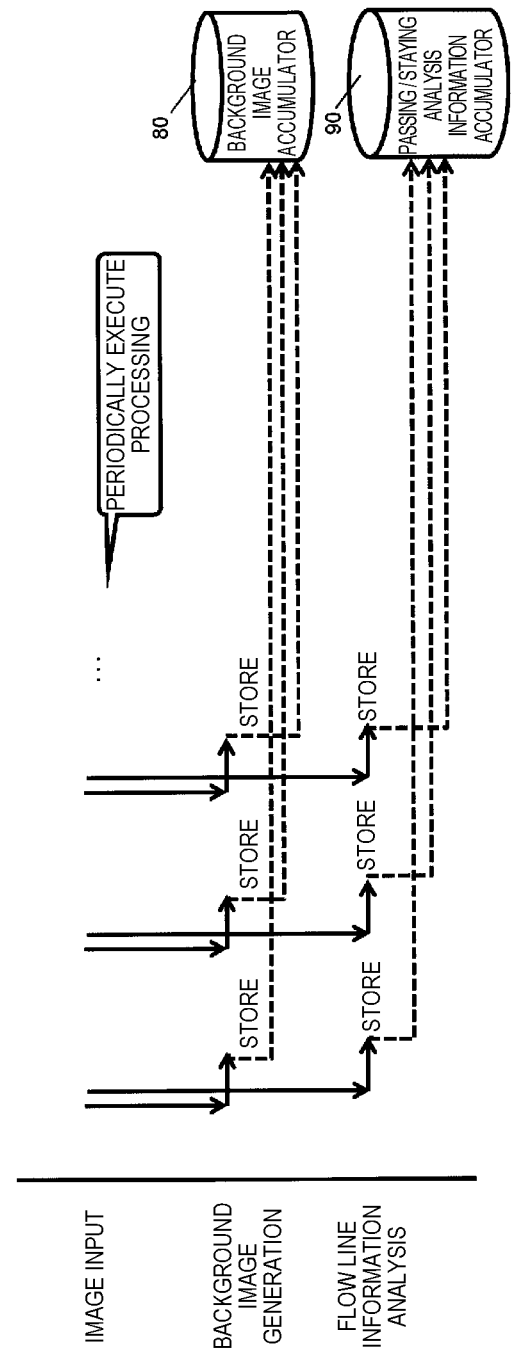
FIG. 5 is a time chart diagram describing an operation timing of each processing of inputting the image, generating the background image, and analyzing the flow line information by the camera device in the present embodiment.
Figure 6:
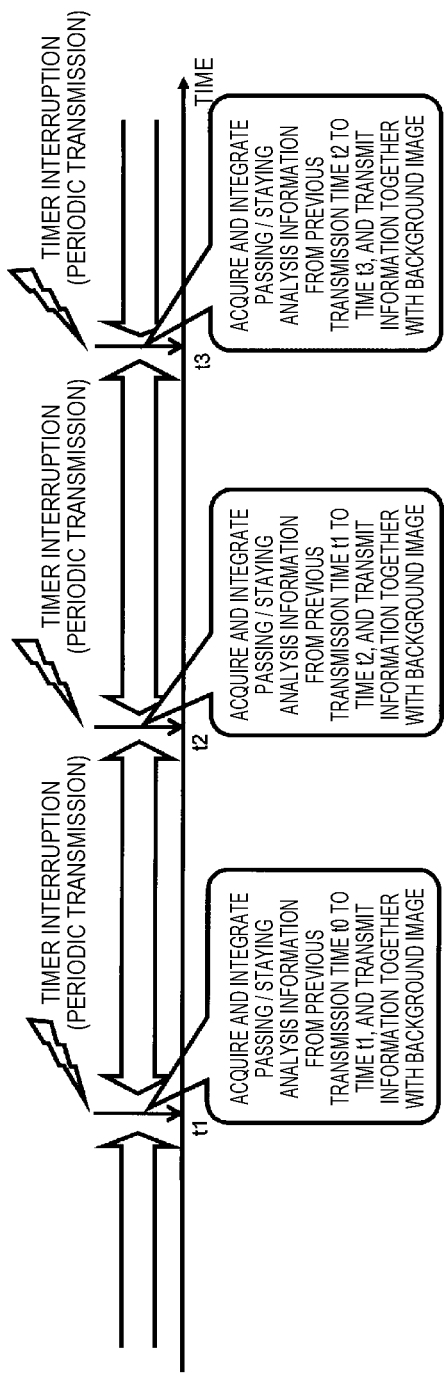
FIG. 6 is a time chart diagram in a case where the camera device in the present embodiment periodically performs transmission processing.
Figure 7:
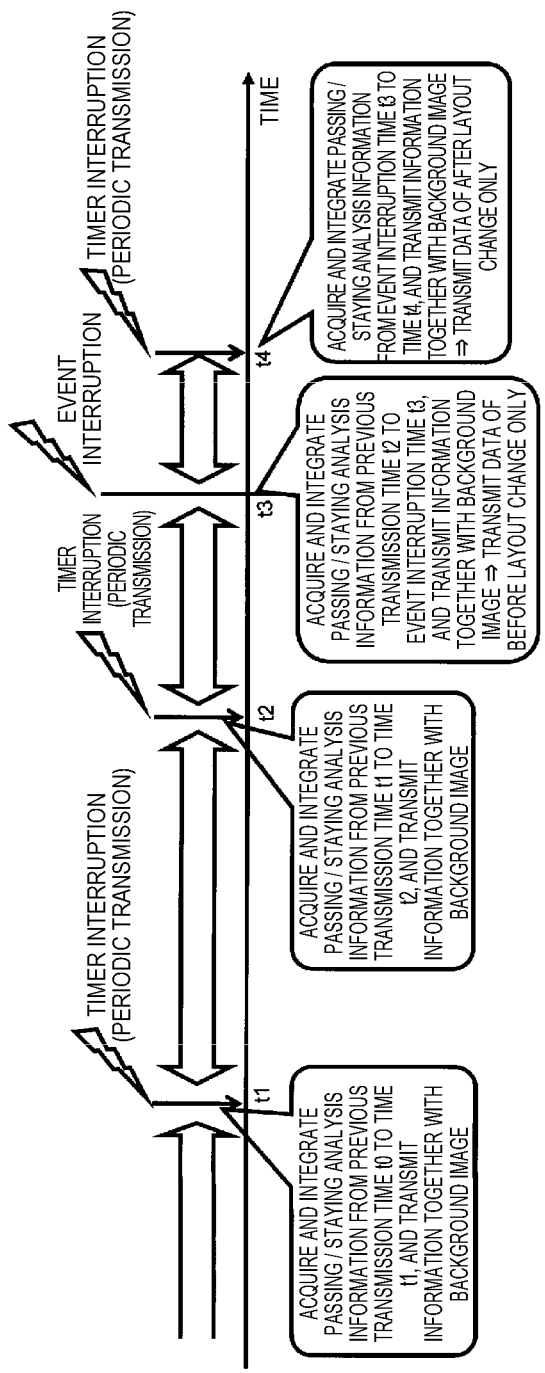
FIG. 7 is a time chart diagram in a case where the camera device in the present embodiment changes the operation timing for the transmission processing according to a detection of an event.
Figure 8:
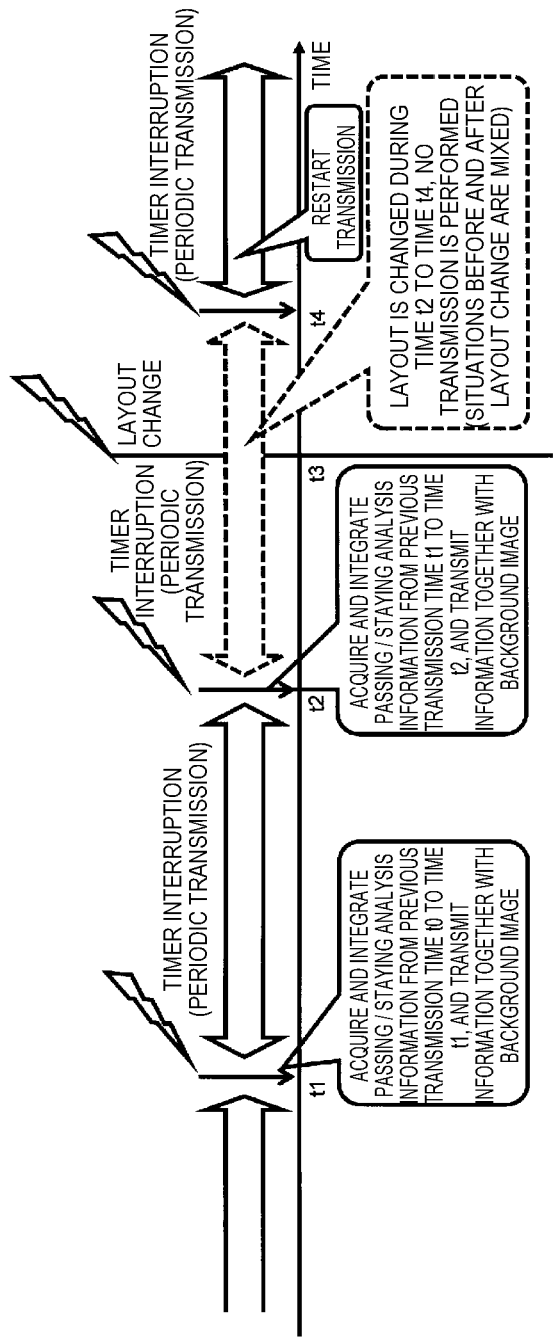
FIG. 8 is a time chart diagram in a case where the camera device in the present embodiment refrains from performing the transmission processing before and after the detection of the event.

Report generation and output unit 360 as an example of a report generator is configured using, for example, a CPU, an MPU, and a DSP, and generates a flow line analysis report (refer to FIG. 12) described below in a case where an instruction to generate the flow line analysis report is input from input device 400. In addition, report generation and output unit 360 as an example of the display controller displays the generated flow line analysis report on monitor 450. Data transmission processing from camera device to server device Next, data transmission processing from camera device 100 to server device 300 will be described with reference to FIGS. 5, 6, 7, and FIG. 8. FIG. 5 is a time chart diagram describing an operation timing of transmission processing of camera device 100 in the present embodiment. FIG. 6 is a time chart diagram in a case where camera device 100 in the present embodiment periodically performs transmission processing. FIG. 7 is a time chart diagram in a case where camera device 100 in the present embodiment changes the operation timing for the transmission processing according to a detection of an event. FIG. 8 is a time chart diagram in a case where camera device 100 in the present embodiment refrains from performing the transmission processing before and after the detection of the event.

In FIG. 5, in camera device 100, when a captured image is output from image input unit 20 (image input), background image generator 30 generates a background image of the captured image output from image input unit 20 and holds the background image in background image accumulator 80 (generation of the background image), and flow line information analyzer 40 extracts flow line information relating to the staying position or the passing position of the moving object (for example, the person) included in the captured image output from image input unit 20 (flow line information analysis). Each processing task of the image input, the generation of the background image, and the flow line information analysis is periodically and repeatedly executed. However, as long as those processing tasks of the image input, the generation of the background image, and the flow line information analysis are periodically and repeatedly executed, the interval of each processing task may not be the same.

For example, after the first execution of each of those processing tasks of the image input, the generation of the background image, and the flow line information analysis illustrated in FIG. 5, when it is an expiration time of the transmission period notified from schedule manager 50 as illustrated in FIG. 7, transmitter 60 receives, for example, a timer interruption from schedule manager 50, and acquires the background image data stored in background image accumulator 80 and data of the result of extracting the flow line information relating to the staying information or the passing information of the moving object stored in passing/staying analysis information accumulator 90 from previous transmission time t0 to current transmission time t1, and then, transmits the data items to server device 300 (time t1). As described above, the periodical transmission intervals (transmission period) in transmitter 60 are 15 minutes, 1 hour, 12 hours, or 24 hours, and are notified from schedule manager 50. In addition, the background image data transmitted from transmitter 60 may be data for one image or may be data for a plurality of images (for example, a plurality of background images obtained for every 5 minutes).

Next, at the time of the second execution of each processing task of the image input, the generation of the background image, and the flow line information analysis illustrated in FIG. 5 and subsequent thereto, when it becomes the expiration time of the transmission period notified from schedule manager 50 as illustrated in FIG. 7, transmitter 60 receives, for example, a timer interruption from schedule manager 50, and acquires the background image data stored in background image accumulator 80 and data of the result of extracting the flow line information relating to the staying information or the passing information of the moving object stored in passing/staying analysis information accumulator 90 from previous transmission time t1 to current transmission time t2, and then, transmits the data items to server device 300 (time t2).

In addition, as illustrated in FIG. 7, when a notification that the predetermined event (for example, the change of the layout of the sales area on floor 1 in store A) is detected is received from event information receiver 70 (time t3), transmitter 60 receives, for example, a timer interruption from event information receiver 70, and acquires the background image data stored in background image accumulator 80 and the data of the result of extracting the flow line information relating to the staying information or the passing information of the moving object stored in passing/staying analysis information accumulator 90 from previous transmission time t2 to current transmission time t3, and then, transmits the data items to server device 300 (time t3). The method of transmission processing in transmitter 60 may be in accordance with any method in either of FIG. 6 or FIG. 8, excluding FIG. 7.

In FIGS. 6, 7, and FIG. 8, the description on the transmission processing having the same content as in FIG. 5 will be simplified or omitted, and the content different from that will be described. Specifically, in FIG. 6, even when an event interruption is received from event information receiver 70 in t3, transmitter 60 refrains from transmitting the background image data stored in background image accumulator 80 and the data of the result of extracting the flow line information relating to the staying information or the passing information of the moving object stored in passing/staying analysis information accumulator 90 to server device 300 from previous transmission time t2 to current transmission time t3 (time t3).

However, in the transmission processing in FIG. 6, in a case where a predetermined event has occurred from time t2 to time t3, the content of the captured image is updated. Therefore, background images from before and after the detection of the event are used in a mixed manner, and thus, there is a possibility that the content of the flow line analysis image is not accurate.

Therefore, in FIG. 7, when the notification of the detection of the predetermined event (for example, the change of the layout in the sales area on floor 1 in store A) is received from event information receiver 70 (time t3), transmitter 60 receives, for example, an event interruption from event information receiver 70, and acquires the background image data stored in background image accumulator 80 and the data of the result of extracting the flow line information relating to the staying information or the passing information of the moving object stored in passing/staying analysis information accumulator 90 from previous transmission time t2 to time t3 when the event interruption is received, and then, transmits the data items to server device 300 (time t3). Furthermore, when the expiration time of the transmission period is reached and notified from schedule manager 50, transmitter 60 receives, for example, the timer interruption from schedule manager 50, and acquires the background image data stored in background image accumulator 80 and the data of the result of extracting the flow line information relating to the staying information or the passing information of the moving object stored in passing/staying analysis information accumulator 90 from time t3 when the event interruption is received to current transmission time t4, and then, transmits the data items to server device 300 (time t4).

In addition, in FIG. 8, even when the event interruption is received from event information receiver 70 at time t3, transmitter 60 refrains from transmitting the background image data stored in background image accumulator 80 and the data of the result of extracting the flow line information relating to the staying information or the passing information of the moving object stored in passing/staying analysis information accumulator 90 to server device 300 from previous transmission time t2 to time t3 when the event interruption is received (time t3). Furthermore, when the expiration time of the transmission period is reached and notified from schedule manager 50, transmitter 60 receives, for example, the timer interruption from schedule manager 50, and refrains from transmitting the background image data stored in background image accumulator 80 and the data of the result of extracting the flow line information relating to the staying information or the passing information of the moving object stored in passing/staying analysis information accumulator 90 to server device 300 from time t3 when the event interruption is received to time t4 (time t4).

In other words, in a case where the event interruption is received from event information receiver 70 at time t3, transmitter 60 refrains from transmitting the background image data stored in background image accumulator 80 and the data of the result of extracting the flow line information relating to the staying information or the passing information of the moving object stored in passing/staying analysis information accumulator 90 to server device 300 from previous transmission time t2 to a start time point (time t4 in FIG. 8) of the next transmission period after the reception of the event interruption (time t2 to time t4).

Furthermore, in FIG. 8, for example, when the timer interruption is received from schedule manager 50 (time t4), transmitter 60 restarts to transmit the background image data stored in background image accumulator 80 and the data of the result of extracting the flow line information relating to the staying information or the passing information of the moving object stored in passing/staying analysis information accumulator 90 to server device 300. Specifically, even though it is not illustrated in FIG. 8, when it becomes the expiration time of the transmission period notified from schedule manager 50 after time t4, transmitter 60 receives, for example, the timer interruption from schedule manager 50 and acquires the background image data stored in background image accumulator 80 and the data of the result of extracting the flow line information relating to the staying information or the passing information of the moving object stored in passing/staying analysis information accumulator 90 from time t4 to the current transmission time, and then, transmits the data items to server device 300.

Figure 9:
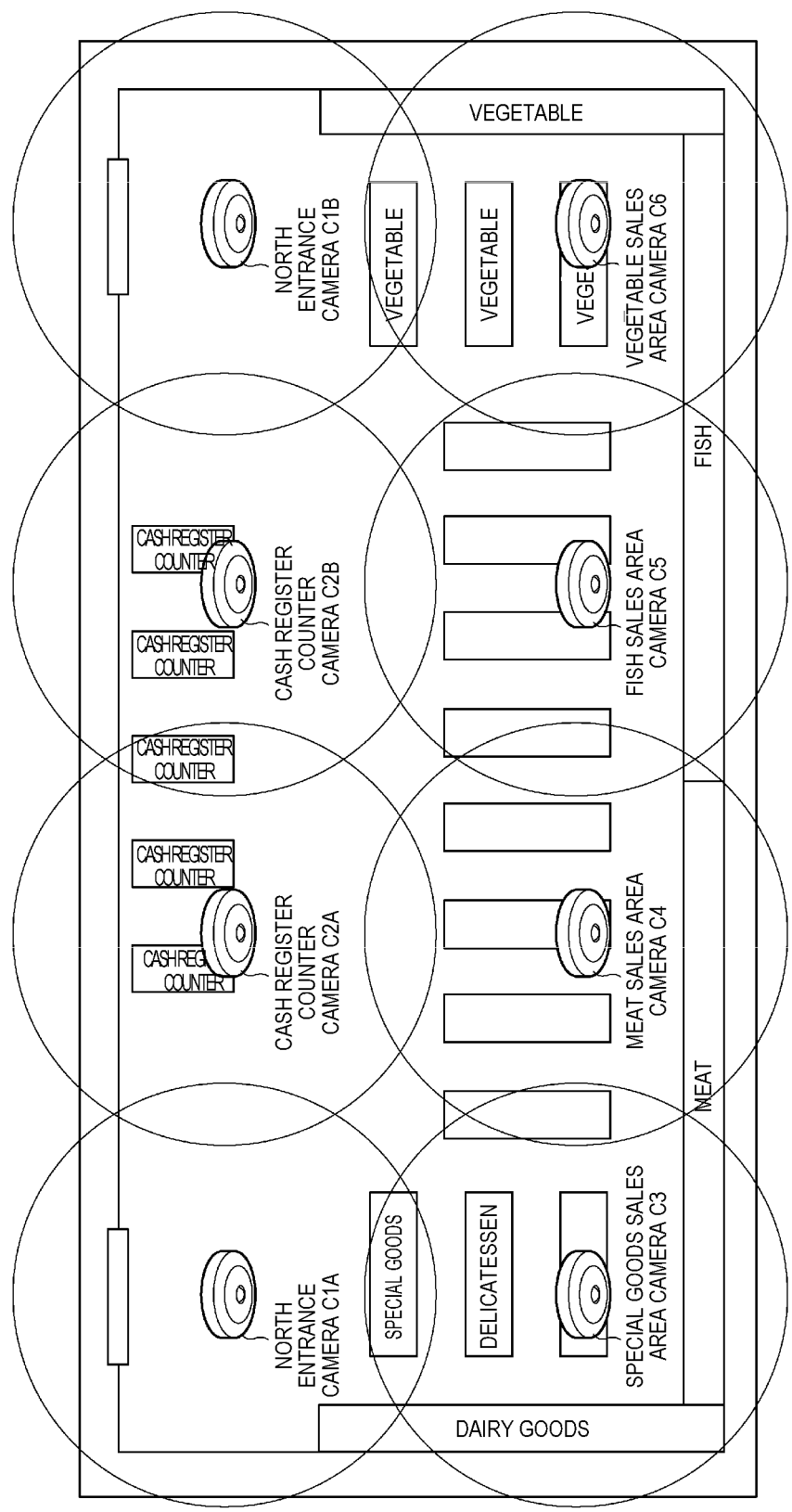
FIG. 9 is a diagram illustrating an example of a layout of a food sales area in which a plurality of camera devices in the present embodiment is installed.

FIG. 9 is a diagram illustrating an example of the layout of the food selling section in which a plurality of camera devices 100 in the present embodiment is installed. In FIG. 9, a situation is illustrated, in which, for example, a plurality of camera devices (for example, eight camera devices) is installed on a ceiling or the like of floor 1 in the food sales area on floor 1 (1F) in store A. Specifically, a total eight of camera devices (for example, omnidirectional camera devices) of north entrance cameras C1A and C1B, cash register cameras C2A and C2B, special goods sales area camera C3, meat sales area camera C4, seafood sales area camera C5, and vegetable sales area camera C6 are installed. The type of the camera devices is not limited to the omnidirectional camera device, but a fixed camera device in which a fixed angle of view is set or a pan-tilt-zoom (PTZ) camera device having functions of panning, tilting and zooming may also be used.

Figure 10:
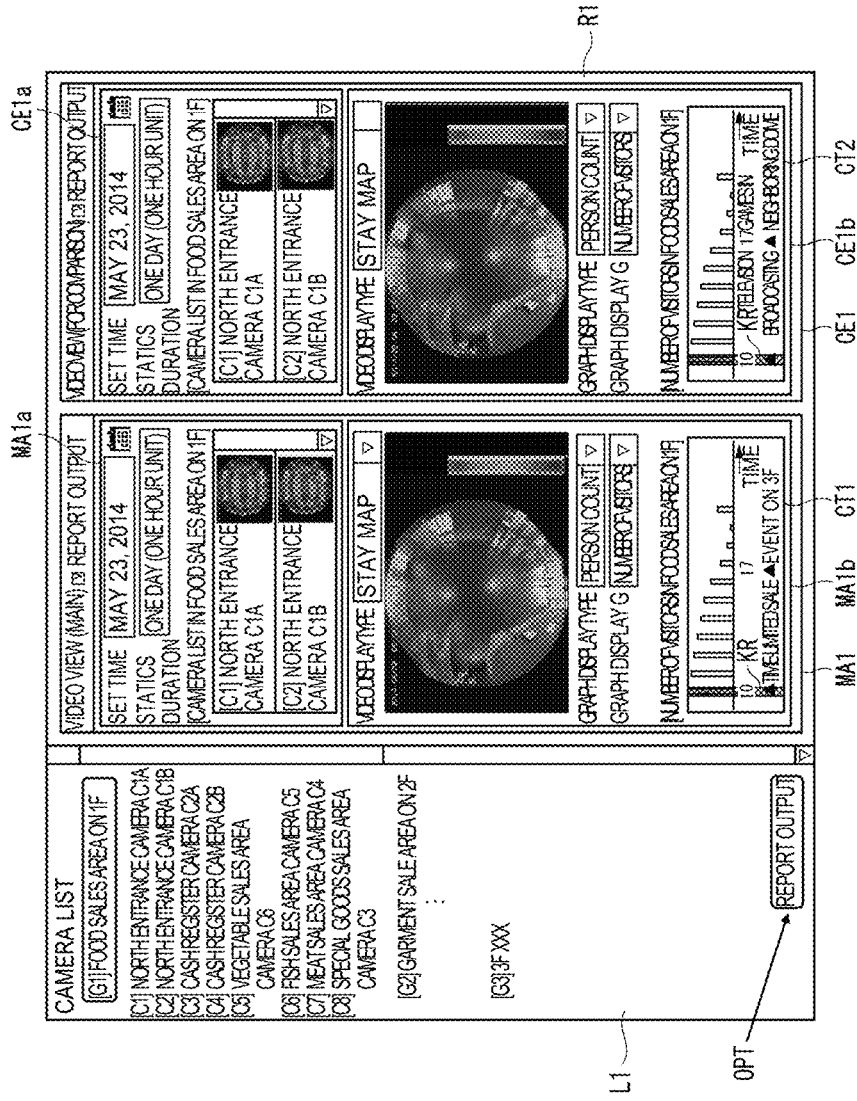
FIG. 10 is a diagram illustrating a first example of an operation screen including the flow line analysis image of store A generated by a display image generator in a server device in the present embodiment.
Figure 11:
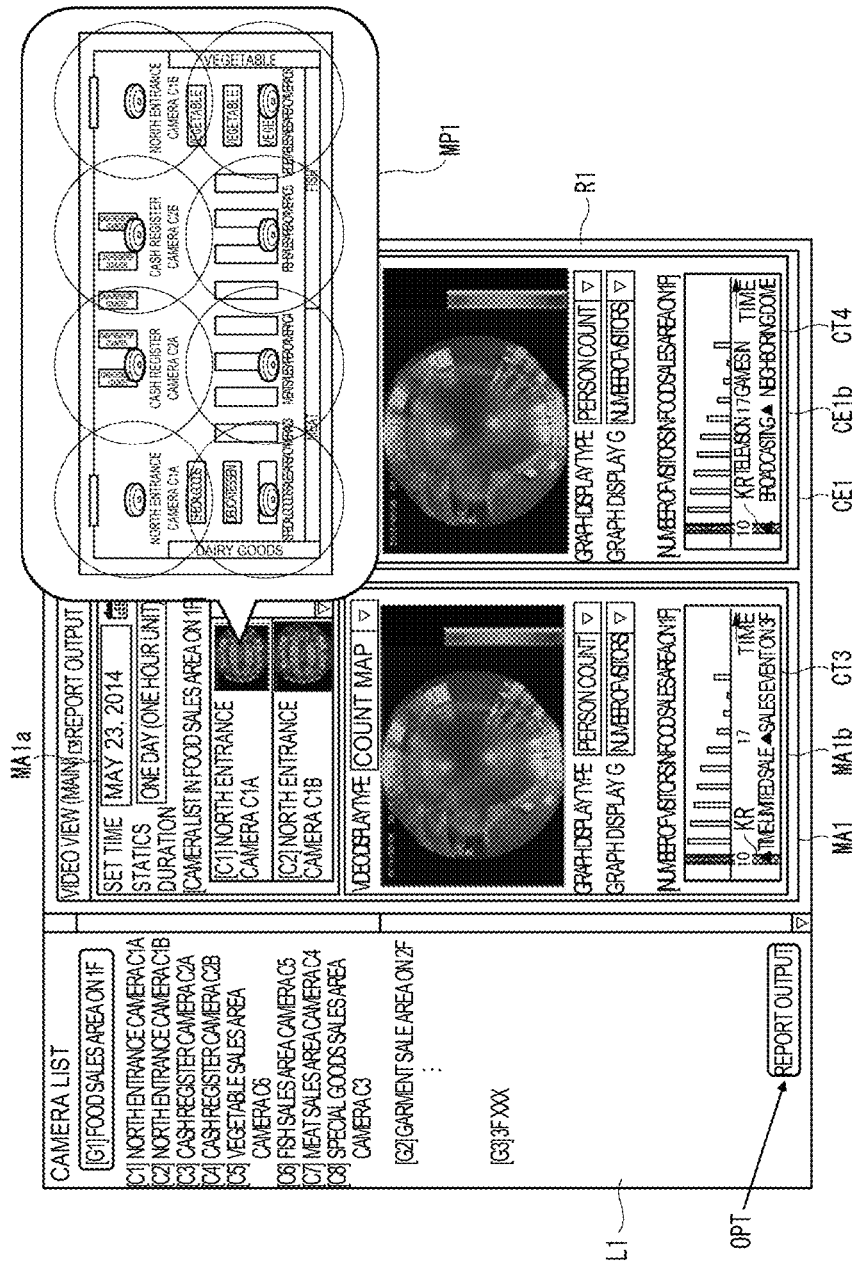
FIG. 11 is a diagram illustrating a second example of an operation screen including the flow line analysis image of store A generated by the display image generator in the server device in the present embodiment.

FIG. 10 is a diagram illustrating a first example of an operation screen including the flow line analysis image of store A generated by display image generator 350 in server device 300 in the present embodiment. FIG. 11 is a diagram illustrating a second example of an operation screen including the flow line analysis image of store A generated by display image generator 350 in server device 300 in the present embodiment. The operation screen illustrated in FIG. 10 and FIG. 11 is displayed on monitor 450 by display image generator 350.

In the operation screen illustrated in FIG. 10, a list of a selection screen of the camera devices installed in the store is hierarchically indicated on left side display area L1. For example, in the food sales area on floor 1 (1F) (identification number: G1), north entrance camera C1A (identification number: C1), north entrance camera C1B (identification number: C2), cash register camera C2A (identification number: C3), cash register camera C2B (identification number: C4), vegetable sales area camera C6 (identification number: C5), seafood sales area camera C5 (identification number: C6), meat sales area camera C4 (identification number: C7), special goods sales area camera C3 (identification number: C8) are hierarchically indicated. Situations in a garment sale area and sale areas of other goods on floor 2 (2F) are similar, and thus, the description thereof will be omitted.

In addition, in the operation screen illustrated in FIG. 10, display area MA1 for the main flow line analysis information (for example, current) and display area CE1 for the sub-flow line analysis information (for example, for the comparison) are displayed on right side display area R1.

Display area MA1 for displaying the flow line analysis information includes specified condition display area MA1a that includes a designated time (including date, month, and year) when server device 300 generated the flow line analysis image of a viewing target, a statistical duration indicating, for example, the unit of half a day, a day, a week, or a month, and the selection screen of the camera device for each sales area selected in display area L1, and flow line analysis result display area MA1b that includes a video display type of the flow line analysis image, a graph display type, graph display G (group), and display area CT1 for displaying the number of visiting customers for each sales area.

The video display type of the flow line analysis image includes a staying map on which the staying information of the moving object (for example, the person) illustrated in FIG. 10 is indicated, a count map on which the passing information of the moving object (for example, the person) illustrated in FIG. 11 is indicated, and the captured image itself. On display area CT1 for displaying the number of visiting customers in each sales area, the number of the moving objects (for example, the persons) detected by person counter CT in time series (for example, every hour in FIG. 10 and FIG. 11) is indicated. For example, by the input operation of the user, when input device 400 shifts selection bar KR indicated on display area CT1 for displaying the number of visiting customers in each sales area in the direction of time axis, display image generator 350 displays the flow line analysis images generated at the time indicated by selection bar KR in an order.

As illustrated in FIG. 11, instead of the selection screen of the camera device for each sales area on display area MA1 for displaying the flow line analysis information, an example of layout MP1 in which a plurality of camera devices illustrated in FIG. 9 is installed in each sales area may be displayed.

In addition, similarly, display area CE1 for displaying the sub-flow line analysis information includes specified condition display area CE1a that includes a designated time (including date, month, and year) when server device 300 generated the flow line analysis image of a viewing target as a target comparison with the display area MA1 for displaying the main flow line analysis information, a statistics duration indicating, for example, the unit of half a day, a day, a week, or a month, and the selection screen of the camera device for each sales area selected in display area MA1 for displaying the main flow line analysis information, and flow line analysis result display area CE1b that includes a video display type of the flow line analysis image, a graph display type, graph display G (group), and display area CT2 for displaying the number of visiting customers for each sales area. In a case using display area CE1 for displaying the sub-flow line analysis information, usages of a comparison between before and after a discount seal is affixed on the products, a comparison between before and after the time-limited sale, a comparison between today and the same day last year, a comparison between the stores (for example, a comparison between a meat sales area in store A and a meat sales area in store B) may be included besides the comparison between, for example, before and after the change of the layout in the store.

On display area CT2 for displaying the number of visiting customers in each sales area, the number of the moving objects (for example, the persons) detected by person counter CT in time series (for example, every hour in FIG. 10 and FIG. 11) is indicated. For example, by the input operation of the user, when input device 400 shifts selection bar KR indicated on display area CT2 for displaying the number of visiting customers for each sales area in the direction of time axis, display image generator 350 reproduces and displays the flow line analysis images generated at the time indicated by selection bar KR in an order.

In addition, in display area CT1 for displaying the number of visiting customers in each sales area on display area MA1 for displaying the main (for example, current) flow line analysis information and in display area CT2 for displaying the number of visiting customers in each sales area on display area CE1 for displaying the sub-flow line analysis information (for example, comparison examples), it is possible to input a comment (for example, a time-limited sale, sales event on 3F, a television broadcast, and sports events taking place at neighboring domes, or the like) while designating specific times on the time axis by a user's input operation of input device 400.

In FIG. 11, the video display type is a count map, and the description on others is similar to those in FIG. 10, and thus, detailed descriptions thereof will be omitted. In FIG. 11 also, similar to FIG. 10, for example, when input device 400 shifts selection bar KR indicated on display areas CT3 and CT4 for displaying the number of visiting customers in each sales area in the direction of time axis by the input operation of the user, display image generator 350 reproduces and displays the flow line analysis images generated at the time indicated by selection bar KR in an order.

Figure 12:
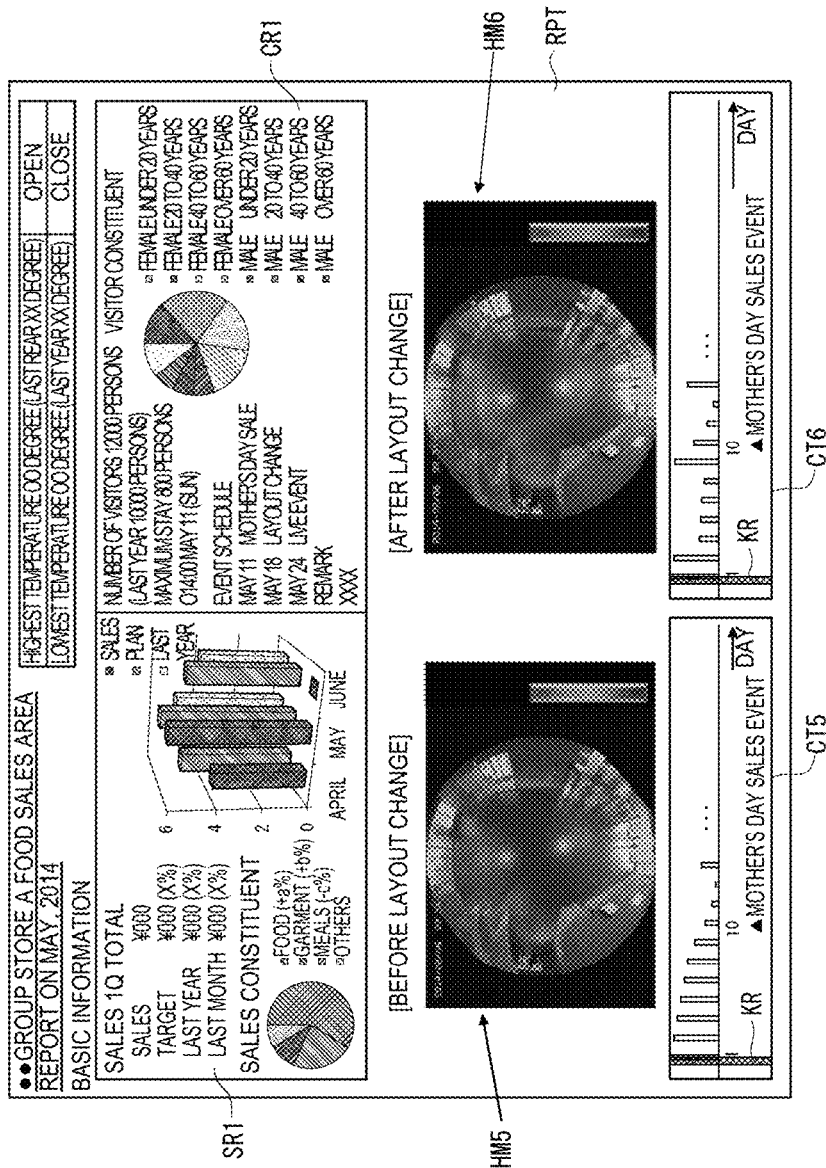
FIG. 12 is a diagram illustrating an example of an operation screen of a monthly report of the food sales area in store A on May, 2014 generated by a report generation and output unit in the server device in the present embodiment.

FIG. 12 is a diagram illustrating an example of operation screen RPT of a monthly report of the food sales area in store A on May, 2014 generated by report generation and output unit 360 in server device 300 in the present embodiment. The monthly report (refer to FIG. 12) as an example of a flow line analysis report in the present embodiment is generated by report generation and output unit 360 when report output button OPT provided on the lower portion on left side display area L1 on the operation screen illustrated in FIG. 10 and FIG. 11 is pressed by input device 400, and then displayed on the screen of monitor 450. Report generation and output unit 360 in server device 300 may output the monthly report illustrated in FIG. 12 or partial information thereof (for example, a monthly report in the meat sales area in the food sales area) on a printer (not illustrated) installed in store A. In this way, the clerk in store A can receive a distributed print-out of the monthly report of, for example, all the food sales area and the meat sales area which is a part thereof, in which the content of the flow line analysis image is printed without the visitors appearing.

On operation screen RPT of the monthly report (flow line analysis report) illustrated in FIG. 12, various information items relating to a title of the monthly report, information relating to the temperature, display area SR1 relating to the sales information, display area CR1 relating to statistical information on the number of visiting customers in the store (for example, store A), a display area for displaying each of flow line analysis images HM5 and HM6 generated by display image generator 350 in between before and after the occurrence of a change of the layout of the sales area as an example of the predetermined event, and display areas CT5 and CT6 for displaying the number of visiting customers in each sales area, are indicated. The various information items relating to a title of monthly reports, information relating to temperature, sales information, event information, information relating to the configuration of the visitors, and the like are transmitted to the server devices (for example, server device 300) in the corresponding stores (for example, store A) from server device 600 in the management headquarters. The various information items relating to a title of monthly reports, information relating to temperature, sales information, event information, information relating to the configuration of the visitors, and the like may be stored in server device 300 in the store or a storage (not illustrated) in advance.

Even in operation screen RPT of the monthly report illustrated in FIG. 12, similar to those in FIG. 10 and FIG. 11, for example, by the input operation of the user, when input device 400 shifts selection bar KR indicated on display areas CT5 and CT6 for displaying the number of visiting customers in each sales area in the direction of time axis, display image generator 350 displays the flow line analysis images generated at the time indicated by selection bar KR in an order.

As described above, in flow line analysis system 500A in the present embodiment, camera device 100 generates a background image of a captured image in a predetermined imaging area, extracts flow line information relating to the staying position or the passing position of a moving object (for example, a person) included in the captured image in an imaging area, and transmits the background image of the captured image and the flow line information of the moving object to server device 300 for each transmission period. Server device 300 generates a flow line analysis image in which the flow line information of the moving object is superimposed on the background image of the captured image, and then, displays this flow line analysis image on monitor 450.

In this way, flow line analysis system 500A generates the background image which becomes the base of the flow line analysis image in such a manner that the moving object (for example, the person) is eliminated so as not to appear in the image. Therefore, when generating the flow line analysis image, it is possible to appropriately protect the privacy of the moving object (the person) that appears in the imaging area. In addition, flow line analysis system 500A superimposes the flow line information relating to the staying position or the passing position in the imaging area of the moving object (the person) on the background image updated at the time point of predetermined timing (for example, when the periodic transmission period comes). Therefore, for every predetermined transmission period, it is possible to visually display the flow line analysis image that appropriately indicates the accurate flow line information relating to the staying position or the passing position of the moving object in the imaging area to the user in a state in which the moving object is eliminated from the captured image.

In addition, in flow line analysis system 500A, schedule manager 50 in the camera device notifies of a predetermined transmission period for transmitting the background image and the flow line information of the moving object. Therefore, it is possible to periodically transmit the background image and the flow line information of the moving object to server device 300 according to the transmission period notified in advance.

In addition, when a notification of detection of a predetermined event (for example, an event of changing a layout of a sales area in a store) is acquired by event information receiver 70, flow line analysis system 500A transmits the background image and the flow line information of the moving object to server device 300. Therefore, in server device 300, it is possible to generate a flow line analysis image in which the flow line information relating to the staying position or the passing position of the moving object in the imaging area before and after the time point when a specific event is detected, is accurately reflected.

In addition, when a change in the captured image (for example, the change of the layout of the sales area in the store) is detected by scene identifier SD, flow line analysis system 500A transmits the background image and the flow line information of the moving object to server device 300. Therefore, in server device 300, it is possible to generate a flow line analysis image in which the flow line information relating to the staying position or the passing position of the moving object in the imaging area before and after the time point when the change of the captured image is detected is accurately reflected.

In addition, flow line analysis system 500A counts the number of detected moving objects included in the captured image by person counter CT and outputs the information relating to the number of detected moving objects to transmitter 60. Therefore, it is possible to display the flow line analysis image including the information relating to the staying position or the passing position of the moving object in the imaging area and a display screen (operation screen) including the number of detected moving objects on monitor 450.

In addition, flow line analysis system 500A refrains from transmitting the background image and the flow line information of the moving object during the transmission period including the time point when the notification that the predetermined event is detected is acquired by event information receiver 70. Therefore, when the flow line analysis image is generated in server device 300, it is possible to prevent the flow line information items relating to the staying position or the passing position of the moving object in the imaging area before and after the predetermined event (for example, the change of the layout of the sales area in the store) from being used in a mixed manner.

In addition, flow line analysis system 500A generates a flow line analysis report that includes a flow line analysis image generated before the detection of the predetermined event (for example, the change of the layout of the sales area in the store) and the flow line analysis image generated after the detection of the predetermined event by report generation and output unit 360. Therefore, it is possible to indicate what changes of the flow line information, relating to the staying position or the passing position of the moving object, are present in the imaging area due to the predetermined event in an easy-to-understandable manner with contrast.

In addition, flow line analysis system 500A displays the generated flow line analysis report on monitor 450 by a predetermined input operation (for example, an operation of pressing a report output button by the user). Therefore, it is possible to visually display the flow line analysis report for the user.

Furthermore, flow line analysis system 500A causes each camera device 100, 100A, . . . , 100N to generate the background image of the captured image and to extract the flow line information relating to the staying position or the passing position of the moving object included in the captured image, and then, to generate and display the flow line analysis image in server device 300. Therefore, compared to a case of causing server device 300 to generate the background image of the captured image and to extract the flow line information relating to the staying position or the passing position of the moving object included in the captured image, a processing load to server device 300 can be reduced, and thus, it is possible to reduce the limitations of the number of camera devices connectable to one server device 300.

Modification Example in the Present Embodiment

In the present embodiment described above, the flow line analysis image generation processing is executed by server device 300. However, even the flow line analysis image generation processing may be executed by camera device 100 (refer to FIG. 13). FIG. 13 is a block diagram illustrating details of the functional and internal configurations of camera device 100S in a modification example of the present embodiment. Camera device 100S illustrated in FIG. 13 is configured to include capture 10, image input unit 20, background image generator 30, flow line information analyzer 40, schedule manager 50, transmitter 60S, event information receiver 70, background image accumulator 80, passing/staying analysis information accumulator 90, and display image generator 350S. In the description for each part in camera device 100S illustrated in FIG. 13, the same reference signs will be given to the configurations and operations that are the same as camera device 100 illustrated in FIG. 2, descriptions thereof will be omitted and only the content different from those thereof will be described.

Display image generator 350S as an example of an image generator generates the flow line analysis image in which the flow line information relating to the staying position or the passing position of the moving object is superimposed on the background image using the background image data stored in background image accumulator 80 and the data of the result of extracting the flow line information relating to the staying information or the passing information of the moving object stored in passing/staying analysis information accumulator 90 according to the instruction from schedule manager 50 or event information receiver 70, and outputs the flow line analysis image to transmitter 60S.

Transmitter 60S transmits the flow line analysis image data generated by display image generator 350S to server device 300.

As described above, in the modification example in the present embodiment, camera device 100S generates a background image of a captured image in a predetermined imaging area, extracts flow line information relating to a staying position or a passing position of a moving object (for example, a person) included in the captured image in an imaging area, and generates a flow line analysis image in which the flow line information of the moving object is superimposed on the background image of the captured image using the background image of the captured image and the flow line information of the moving object.

In this way, camera device 100S generates the background image which becomes the base of the flow line analysis image in such a manner that the moving object (for example, the person) is eliminated so as not to be reflected. Therefore, when generating the flow line analysis image, it is possible to appropriately protect the privacy of the moving object (the person) reflected in the imaging area. In addition, camera device 100S superimposes the flow line information relating to the staying position or the passing position in the imaging area of the moving object (the person) on the captured image obtained in real time. Therefore, it is possible to generate the flow line analysis image that appropriately indicates the latest flow line information relating to the staying position or the passing position of the moving object in the imaging area to the user in a state in which the moving object is eliminated from the captured image.

In addition, camera device 100S executes the flow line analysis image generation processing until the data is generated, and then, transmits the flow line analysis image data which is a generation result to server device 300. Therefore, for example, in a state in which the processing load on server device 300 is significantly high, since server device 300 may be caused to not execute the flow line analysis image generation processing, it is possible to suppress the increase of the processing load on server device 300.

Figure 14:
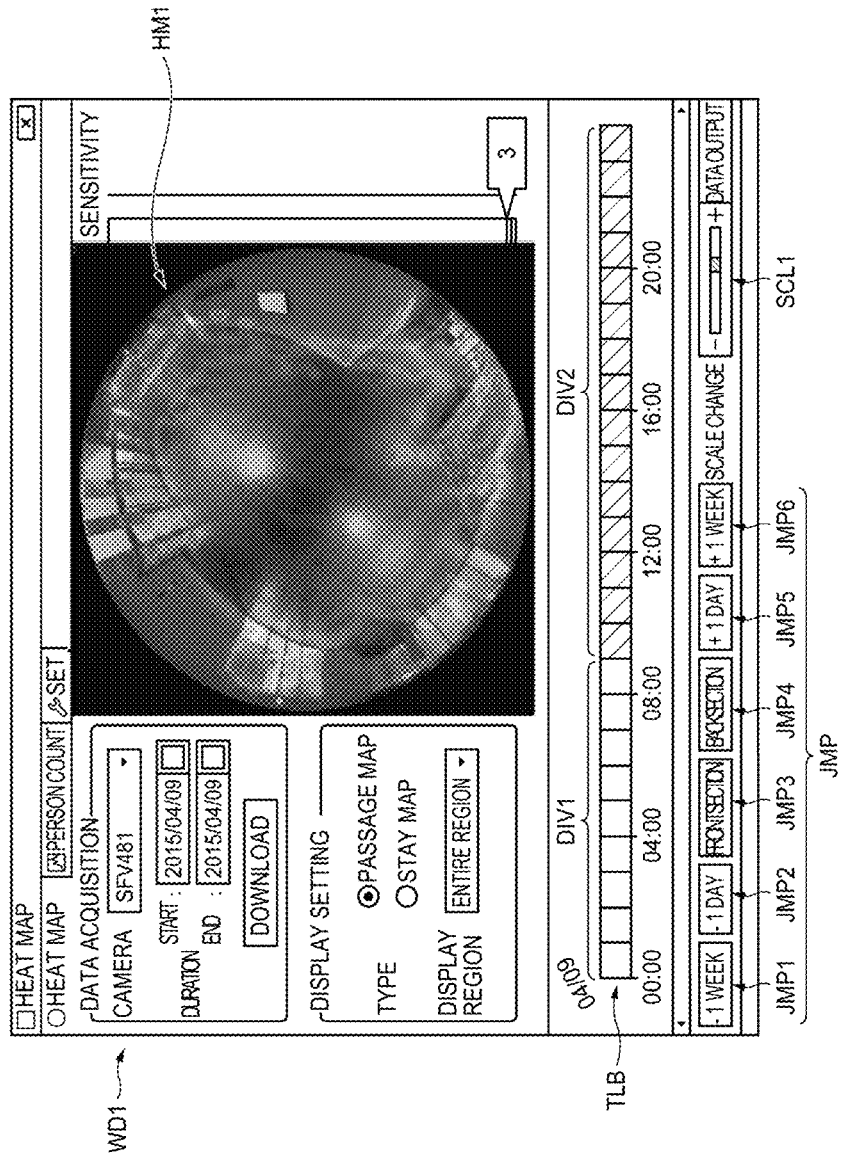
FIG. 14 is a diagram illustrating a third example of an operation screen including the flow line analysis image of store A generated by the display image generator in the server device in the present embodiment.

In addition, when the operation screen including the generated flow line analysis image is displayed on monitor 450, server device 300 in the present embodiment may display operation screen WD1 illustrated in FIG. 14 besides the operation screens illustrated in FIG. 10 and FIG. 11. FIG. 14 is a diagram illustrating a third example of an operation screen including the flow line analysis image of store A generated by the display image generator 350 in server device 300 in the present embodiment.

The following fields are displayed in operation screen WD1 illustrated in FIG. 14: an input field (dada acquisition filed) of the specified conditions for the data necessary for generating the flow line analysis image (that is, the background image data stored in background image accumulator 80 and the data of the result of extracting the flow line information relating to the staying information or the passing information of the moving object stored in passing/staying analysis information accumulator 90, and hereafter, referred to as "camera transmission data"), an input field (display setting field) of the setting items relating to the displaying of the flow line analysis image, flow line analysis image HM1, time line bar TLB, jump button JMP configured from a plurality of buttons, and scale change button SCL1.

In the data acquisition field, the identification number of the camera device which is a transmission source of the camera transmission data described above, and a starting date and an ending date of a target period (that is, a period during which the background image data and the data of the result of extracting the flow line information relating to the staying information or the passing information of the moving object are generated) of requesting the camera transmission data, are designated. When a download button is pressed, server device 300 receives to acquire the camera transmission data that matches the conditions specified in the data acquisition field from the corresponding camera device (for example, camera device 100), or acquires the data already received and accumulated in server device 300.

In the display setting field, any of a passage map (that is, an image in which the number of persons passing a specific place in the imaging area is visually indicated as a heat map) or a staying map (that is, an image in which a time during which a person stayed at a specific place is visually indicated as a heat map) is selected as a type of displaying the flow line analysis image. If necessary, among the flow line analysis image of the imaging area generated by display image generator 350, a region for displaying may be selected.

In time line bar TLB, for example, in a case where one day of "Apr. 9, 2015" is designated in the data acquisition field, the presence or absence of camera transmission data from the camera device is indicated for each time segment (hereafter, referred to as "scale"). That is, the presence or absence of the camera transmission data from the camera device for 24 hours in "Apr. 9, 2015" can be visually determined by the presence or absence of a total of 24 colors or design patterns in each cell of time line bar TLB. More specifically, in time range DIV1 (that is, a time range from 00:00 AM to 09:00 AM on Apr. 9, 2015), it is indicated that the camera transmission data from the camera device was not present, and in time range DIV2 (that is, a time range from 09:00 AM to 24:00 PM on Apr. 9, 2015), it is indicated that the camera transmission data from the camera device was present. In FIG. 14, a time segment (that is, one cell) corresponding to a scale indicates one hour.

The time segment corresponding to the scale (that is, one cell) can be easily changed by sliding scale change button SCL1 to the right or left direction. For example, in a case where the time segment corresponding to the scale (that is, one cell) indicates one cell, if the user operates input device 400 such as a mouse and slides scale change button SCL1 to the right or left direction, display image generator 350 changes the time segment corresponding to the scale (that is, one cell) to one day which is longer than one hour, and displays time line bar TLB again. Not limited to one day, the time segment longer than one hour may be arbitrarily changed to, for example, two hours. This change can be set according to the user's operation on the screen selected by a setting tab on operation screen WD1 illustrated in FIG. 14.

Similarly, for example, in a case where the time segment corresponding to the scale (that is, one cell) is indicated as one hour, if the user operates input device 400 such as the mouse and slides scale change button SCL1 to the right and left direction, display image generator 350 changes the time segment corresponding to the scale (that is, one cell) to 15 minutes which is shorter than one hour, and displays time line bar TLB again. Not limited to 15 minutes, the time segment longer than one hour may be arbitrarily changed to, for example, 30 minutes. This change can be set according to the user's operation on the screen selected by the setting tab on operation screen WD1 illustrated in FIG. 14.

In jump button JMP, − one week button JMP1, − one day button JMP2, front section button JMP3, back section button JMP4, + one day button JMP5, + one week button JMP6 are provided. However, jump button JMP is not limited to those six types of buttons. For example, the numbering portions of the "− one week button JMP1, − one day button JMP2, + one day button JMP5, + one week button JMP6" having numbers in the names of buttons can be arbitrarily changed by the user's operation on a setting screen which is not illustrated (for example, the screen selected by the setting tab on operation screen WD1 illustrated in FIG. 14).

For example, in a case where the camera transmission data from the current time to a point in time which occurred a week ago is acquired from the camera device, when − one week button JMP1 is pressed by the user's operation, display image generator 350 switches flow line analysis image HM1 displayed at the time of pressing to the flow line analysis image generated one week before the above-described flow line analysis image, and displays the flow line analysis image on monitor 450.

Figure 17:
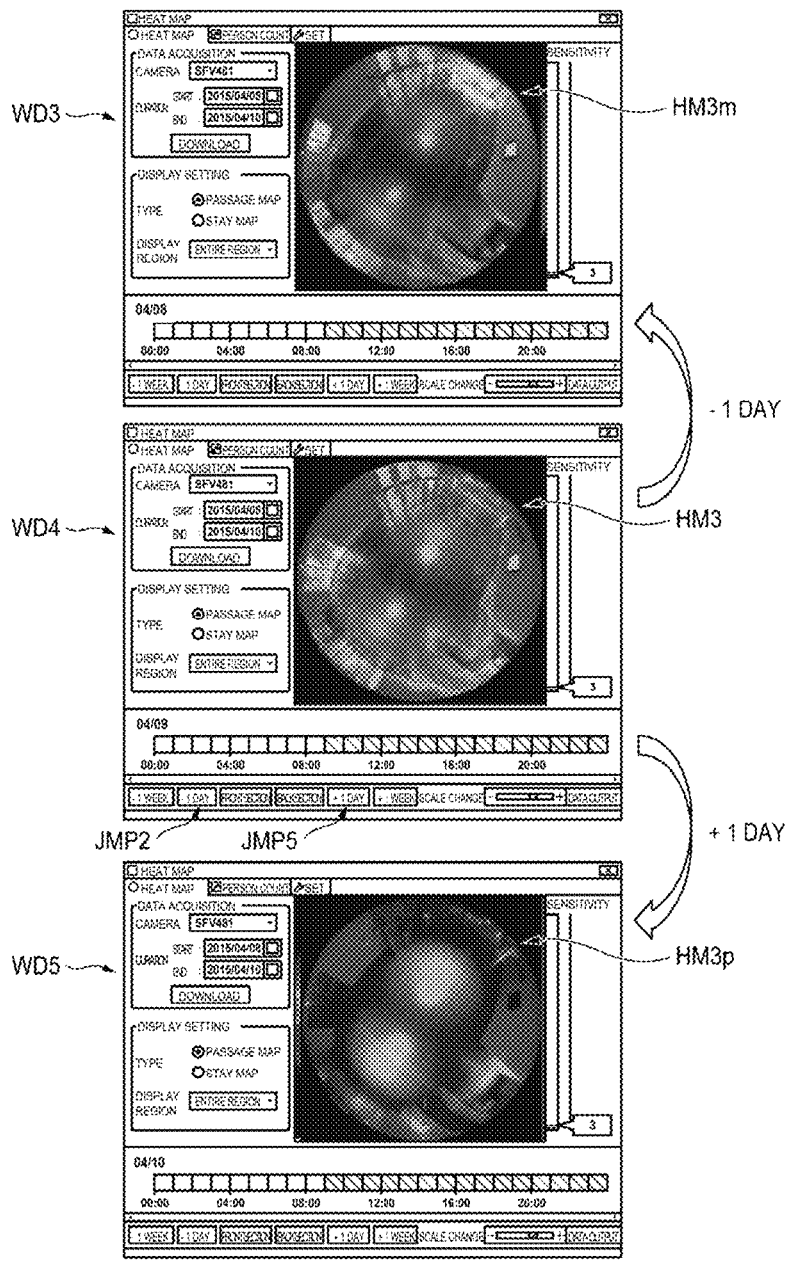
FIG. 17 is a diagram describing an example of a switched display of the flow line analysis images corresponding to pressing of a + one day button and a − one day button among jump buttons illustrated in FIG. 14.

For example, in a case where the camera transmission data up to the time point back to a week ago from the current time is acquired from the camera device, when − one day button JMP2 is pressed by the user's operation, display image generator 350 switches flow line analysis image HM1 displayed at the time of pressing to the flow line analysis image generated one day before the above-described flow line analysis image, and displays the flow line analysis image on monitor 450 (refer to FIG. 17).

For example, in a case where the camera transmission data up to the time point after one day from the current time is acquired from the camera device, when + one day button JMP5 is pressed by the user's operation, display image generator 350 switches flow line analysis image HM1 displayed at the time of pressing to the flow line analysis image generated one day after the above-described flow line analysis image, and displays the flow line analysis image on monitor 450 (refer to FIG. 17).

For example, in a case where the camera transmission data up to the time point after one week from the current time is acquired from the camera device, when + one week button JMP6 is pressed by the user's operation, display image generator 350 switches flow line analysis image HM1 displayed at the time of pressing to the flow line analysis image generated one week after the above-described flow line analysis image, and displays the flow line analysis image on monitor 450.

In addition, the generation time point (in other words, a time or time segment for starting the jump) of the camera transmission data which is the base of the flow line analysis image in a case where jump button JMP is pressed can be set according to the user's operation on the screen selected by the setting tab on operation screen WD1 illustrated in FIG. 14.

Figure 15:
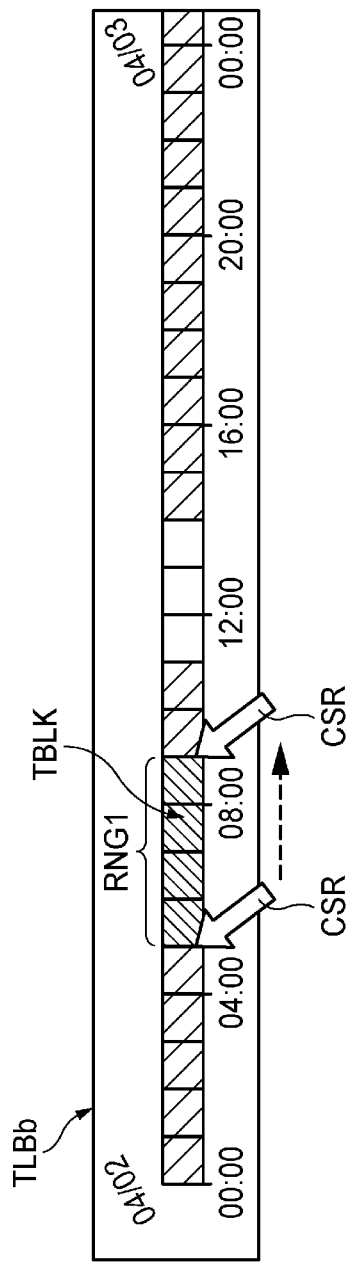
FIG. 15 is a diagram describing a timeline bar.

Before describing front section button JMP3 and back section button JMP4, a description regarding one section will be described with reference to FIG. 15. FIG. 15 is a diagram describing the timeline bar. In FIG. 15, for the convenience of the description, time line bar TLBb is illustrated which is different from time line bar TLB included in operation screen WD1 illustrated in FIG. 14.

In FIG. 15, the time segment corresponding to the scale (that is, one cell) is one hour similar to that in FIG. 14. The user can determine the presence or absence of the camera transmission data from the camera device by the colors or design patterns displayed on time line bar TLBb. In addition, by operating server device 300 or input device 400, the user can simply designate on time line bar TLBb whether the flow line analysis image of which time segment is displayed on monitor 450.

For example, the user operates input device 400 such as a mouse, and designates a position of cursor CSR on a cell of a starting time of designation target time segment RNG1 (for example, left click), and thereafter, drags cursor CSR up to an ending time of time segment RNG1, and then, releases the button of input device 400 such as the mouse at the position of ending the dragging (that is, ends the dragging). When the user's finger pressing the button of input device 400 such as the mouse is released at the position of ending the dragging, display image generator 350 fixes the starting time and the ending time of time segment RNG1. In this way, display image generator 350 displays the colors or design patterns of time segment RNG1 designated by the user's operation, which changes and is different from the colors or design patterns indicating the presence of the camera transmission data from the camera device (refer to FIG. 15).

For example, in time line bar TLBb illustrated in FIG. 15, time segment RNG1 is a time segment from 05:00 AM to 09:00 AM, on April 2, and the colors and design patterns corresponding to this time segment RNG1 were different from the colors and design patterns in the time segment from 00:00 AM to 11:00 AM and after 02:00 PM on April 2, during which the camera transmission data from the camera device was present. It is assumed that time line bar TLBb illustrated in FIG. 15 is in a state of being displayed so as to be included in operation screen WD1 illustrated in FIG. 14, that the flow line analysis image in this operation screen was generated using the camera transmission data for three days for example, and that the time segment corresponding to the scale (that is, one cell) is, for example, one hour. In this case, time line bar TLBb has a total length of cells equal to that of three days (that is, 24 hours×three days=72 cells). However, in a case where it is not possible to display all of the cells on the operation screen, display image generator 350 displays time line bar TLBb so as to be scrolled in the rightward and leftward direction. Therefore, in a case where the user wants to check whether or not the data transmitted from the camera is present at the date and time which are not displayed on time line bar TLBb, it is possible to easily check the presence by the scrolling operation of time line bar TLBb.

Display image generator 350, for example, treats time segment RNG1 described above with reference to FIG. 15 as one section, and when previous section JMP3 among jump buttons JMP illustrated in FIG. 14 is pressed by the user's operation, switches flow line analysis image HM1 displayed at the time of pressing to the flow line analysis image generated at the time one section before flow line analysis image HM1 (for example, four hours corresponding to time segment RNG1) and displays the flow line analysis image on monitor 450.

On the other hand, display image generator 350, for example, treats time segment RNG1 described above with reference to FIG. 15 as one section, and when back section JMP4 among jump buttons JMP illustrated in FIG. 14 is pressed by the user's operation, switches flow line analysis image HM1 displayed at the time of pressing to the flow line analysis image generated at the time one section after flow line analysis image HM1 (for example, four hours corresponding to time segment RNG1) and displays the flow line analysis image on monitor 450. As a result, an operator can compare one section with the other section in different time segment, then, can analyze flow line analysis image before and after an event and so on.

Figure 16:
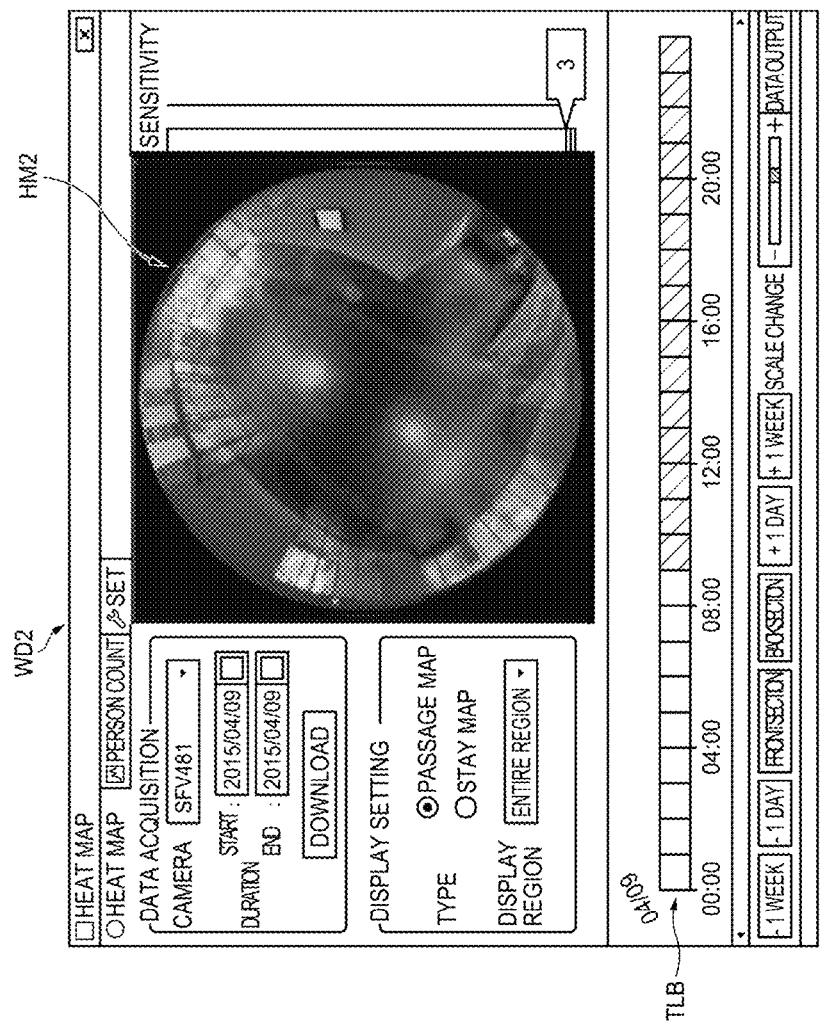
FIG. 16 is a diagram illustrating an example of an operation screen that includes the flow line analysis image of store A corresponding to the designated time range after the change with respect to the timeline bar included in the operation screen illustrated in FIG. 14.

FIG. 16 is a diagram illustrating an example of operation screen WD2 that includes the flow line analysis image of store A corresponding to the designated time range after the change with respect to timeline bar TLB included in operation screen WD1 illustrated in FIG. 14. In FIG. 16, the time range in time line bar TLB designated by the user is changed, and thus, flow line analysis image HM1 illustrated in FIG. 14 is switched to flow line analysis image HM2 corresponding to the time range after the change, and flow line analysis image HM2 is generated by display image generator 350 and is displayed on monitor 450.

In addition, after time segment TBLK (refer to time segment RNG1 illustrated in FIG. 15) corresponding to one section is defined by the designation operation of the user on time line bar TLB, time segment TBLK may be moved on time line bar TLB in a state in which time segment TBLK is temporarily fixed by the user performing the operation (for example, right click) of input device 400 such as the mouse with respect to defined time segment TBLK (in other words, in a state in which defined time segment TBLK is fixed on time line bar TLB). By this moving operation, display image generator 350 can generate the flow line analysis image corresponding to the time segment after the moving operation and display the image on monitor 450.

For example, in a case where the time segment before the moving operation is 09:00 AM to 01:00 PM and the time segment after the moving operation is 04:00 PM to 08:00 PM (lengths of both the time segments are four hours respectively), display image generator 350 switches operation screen WD2 including the flow line analysis image corresponding to the time segment 09:00 AM to 01:00 PM to another operation screen including the flow line analysis image corresponding to the time segment 04:00 PM to 08:00 PM, and displays the flow line analysis image on monitor 450.

FIG. 17 is a diagram describing an example of a switched display of the flow line analysis images corresponding to pressing of + one day button JMP5 and − one day button JMP2 among jump buttons JMP illustrated in FIG. 14. In FIG. 17, the start date in the data acquisition field is Apr. 8, 2015 and the end date is Apr. 10, 2015, and it is assumed that server device 300 acquired the data transmitted from the camera device for these three days and the current time is assumed to be Apr. 9, 2015.

For example, in a case where the data transmitted from the camera device is acquired up to the time point (Apr. 8, 2015) of one day back to the current time point (Apr. 9, 2015), when − one day button JMP2 is pressed, display image generator 350 switches flow line analysis image HM3 displayed at the time of pressing to flow line analysis image HM3*m* generated one day before above-described flow line analysis image HM3, and displays the operation screen including flow line analysis image HM3*m* on monitor 450.

In addition, in a case where the data transmitted from the camera device is acquired up to the time point (Apr. 10, 2015) of one day after the current time point (Apr. 9, 2015), when + one day button JMP5 is pressed, display image generator 350 switches flow line analysis image HM3 displayed at the time of pressing to flow line analysis image HM3*p* generated one day after above-described flow line analysis image HM3, and displays the operation screen including flow line analysis image HM3*p* on monitor 450 (refer to FIG. 17).

In this way, when generating the flow line analysis image, server device 300 in the present embodiment can visually display the flow line analysis image that appropriately indicates the accurate flow line information relating to the staying position or the passing position of the moving object in the imaging area to the user in a state in which the moving object is eliminated from the captured image while appropriately protecting the privacy of the moving object (the person) which is reflected on the imaging area, and furthermore, the flow line analysis image is switched to the image generated at the different timing by a simple operation (pressing any button among jump buttons JMP) of the user and can be displayed, and thus, it is possible to improve the convenience (for example, convenience in checking the trend among the flow line analysis images) of the user.

What is claimed is:

1. A flow line analysis system to which a camera device and a server device are connected,
    wherein the camera device, in operation,
    generates captured images, and
    extracts flow line information relating to a staying position of a moving person or where a moving person passes,
    wherein the server device, in operation,
    downloads, from a plurality of camera devices including the camera device, the generated captured images and the extracted flow line information of the moving person,
    displays an acquisition menu including selections of camera device identifiers and target period durations,
    receives, from a user via the acquisition menu, a selection of a camera device identifier of the camera device and a target period having a target period duration,
    in response to receiving the selection of the camera device identifier of the camera device and the target period,
    generates, for the target period, flow line analysis images in which the flow line information of the moving person is superimposed on the captured images, the flow line analysis image providing an indication of a number of moving persons passing a position in the captured image,
    displays a first flow line analysis image on the display, the first flow line analysis image being associated with a first time instance in the target period, and
    displays, on the display, a selection of a plurality of image leap commands respectively associated with a plurality of predefined second time instances, a first set of the plurality of predefined second time instances temporally preceding the first time instance and a second set of the plurality of predefined second time instances temporally succeeding the first time instance,
    receives, from the user via the displayed selection of the plurality of image leap commands, a selection of a predefined second time instance of the plurality of predefined second time instances, and
    when the selected predefined second time instance is within the target period, displays a second flow line analysis image generated for the selected predefined second time instance.

2. A flow line analysis system to which a camera device and a server device are connected,
    wherein the camera device, in operation,
    generates a background image of a captured image,
    extracts flow line information relating to a staying position of a moving person or where a moving person passes, and
    wherein the server device, in operation,
    downloads, from the camera device, the generated background image and the extracted flow line information of the moving person,
    displays an acquisition menu including selections of camera device identifiers and target period durations,
    receives, from a user via the acquisition menu, a selection of a camera device identifier of the camera device and a target period having a target period duration,
    in response to receiving the selection of the camera device identifier of the camera device and the target period,
    generates, for the target period, a flow line analysis images in which the flow line information of the moving person is superimposed on the background image, the flow line analysis image providing an indication of a number of moving persons passing a position in the captured image, and displays a first flow line analysis image on the display, the first flow line analysis image being associated with a first time instance in the target period, and displays, on the display, a selection of a plurality of image leap commands respectively associated with a plurality of predefined second time instances, a first set of the plurality of predefined second time instances temporally preceding the first time instance and a second set of the plurality of predefined second time instances temporally succeeding the first time instance, receives, from the user via the displayed selection of the plurality of image leap commands, a selection of a predefined second time instance of the plurality of predefined second time instances, and when the selected predefined second time instance is within the target period, displays a second flow line analysis image generated for the selected predefined second time instance.

3. The system of claim 1, wherein the camera device repeatedly generates the captured image.

4. The system of claim 1, wherein the camera device, generates a captured image, extracts first flow line information relating to a staying position of a moving person and second flow line information relating to where a moving person passes, and transmits the generated captured image and the extracted first flow line information and the second flow line information to the server device for each predetermined transmission period, and wherein, according to a setting, the server device displays a first flow line analysis image in which the first flow line information is superimposed on the captured image or a second flow line analysis image in which the second flow line information is superimposed on the captured image.

5. The system of claim 1, wherein the server device, displays a time line bar that arbitrarily sets a period of the flow line analysis image in which the flow line information is superimposed on the captured image, and displays the flow line analysis image in the period arbitrarily set on the time line bar.

6. The system of claim 5, wherein the server device displays the time line bar on a screen same as the screen on which the flow line analysis image is displayed.

7. The system of claim 5, wherein the time line bar indicates the presence or absence of the captured image from the camera device and the flow line information for each predetermined period.

8. A flow line analysis method in a flow line analysis system to which a camera device and a server device are connected, the flow line analysis method comprising:

generating captured images, and extracting flow line information relating to a staying position of a moving person or where a moving person passes, and causing the server device to:

display an acquisition menu including selections of camera device identifiers and target period durations, receive, from a user via the acquisition menu, a selection of a camera device identifier of the camera device and a target period having a target period duration, in response to receiving the selection of the camera device identifier of the camera device and the target period, retrieve, from the camera device, the generated captured images and the extracted flow line information of the moving person, generate, for the target period, flow line analysis images in which the flow line information of the moving person is superimposed on the captured images, the flow line analysis image providing an indication of a number of moving persons passing a position in the captured image, display a first flow line analysis image on the display, the first flow line analysis image being associated with a first time instance in the target period, display, on the display, a selection of a plurality of image leap commands respectively associated with a plurality of predefined second time instances, a first set of the plurality of predefined second time instances temporally preceding the first time instance and a second set of the plurality of predefined second time instances temporally succeeding the first time instance, receive, from the user via the displayed selection of the plurality of image leap commands, a selection of a predefined second time instance of the plurality of predefined second time instances, when the selected predefined second time instance is within the target period, display a second flow line analysis image generated for the selected predefined second time instance.

9. The flow line analysis system of claim 1, wherein the server device, in operation, displays a field, selection of the field initiating the operation of changing the timing of the target period.

10. The flow line analysis system of claim 2, wherein the server device, in operation, displays a field, selection of the field initiating the operation of changing the timing of the target period.

11. The flow line analysis method of claim 8, further comprising causing the server device to display a field which upon selection initiates the operation of changing the timing of the target period.

* * * * *